(12) United States Patent
Nakajima

(10) Patent No.: US 7,485,886 B2
(45) Date of Patent: Feb. 3, 2009

(54) LIGHT EMITTING DEVICE, DRIVING METHOD THEREOF, AND IMAGE FORMING APPARATUS

(75) Inventor: Akira Nakajima, Matsumoto (JP)

(73) Assignee: Seiko Epson Corporation, Tokyo (JP)

( * ) Notice: Subject to any disclaimer, the term of this patent is extended or adjusted under 35 U.S.C. 154(b) by 330 days.

(21) Appl. No.: 11/467,359

(22) Filed: Aug. 25, 2006

(65) Prior Publication Data

US 2007/0052983 A1 Mar. 8, 2007

(30) Foreign Application Priority Data

| Sep. 6, 2005 | (JP) | ............................. 2005-257554 |
| Sep. 28, 2005 | (JP) | ............................. 2005-281523 |
| May 12, 2006 | (JP) | ............................. 2006-133594 |

(51) Int. Cl.
*G09G 3/36* (2006.01)

(52) U.S. Cl. ........................ 250/553; 347/132; 347/133; 347/135

(58) Field of Classification Search .................. 250/552, 250/553; 347/129, 130, 132, 133, 135
See application file for complete search history.

(56) References Cited

U.S. PATENT DOCUMENTS 6,130,700 A 10/2000 Murayama et al.

| 6,603,496 B2 * | 8/2003 | Nagumo et al. ............. 347/131 |
| 7,075,674 B2 * | 7/2006 | Nagumo et al. ............ 358/1.16 |
| 2005/0207157 A1 * | 9/2005 | Tani ........................... 362/244 |
| 2007/0052983 A1 * | 3/2007 | Nakajima ................... 358/1.6 |

FOREIGN PATENT DOCUMENTS

| JP | A-2004-330472 | 11/2004 |
| KR | 1999-004436 A | 6/1999 |

* cited by examiner

*Primary Examiner*—John R Lee
(74) *Attorney, Agent, or Firm*—Oliff & Berridge, PLC

(57) ABSTRACT

A light emitting device includes: a plurality of light emitting elements that emit light to have luminosity depending on the magnitude of a driving signal; a plurality of holding units that are respectively disposed in the plurality of light emitting elements, and respectively hold the driving signal to maintain a magnitude regulated such that the luminosity of the plurality of light emitting elements becomes uniform; and a plurality of supply units that are respectively disposed in the plurality of light emitting elements, and supply the driving signal, which is held by the holding units to have a certain magnitude for a period of time according to a gradation of light to be emitted, to a corresponding light emitting element.

20 Claims, 16 Drawing Sheets

LIGHT EMITTING DEVICE, DRIVING METHOD THEREOF, AND IMAGE FORMING APPARATUS

BACKGROUND

1. Technical Field

The present invention relates to a light emitting device using a light emitting material such as an organic EL (Electroluminescent) material, a driving method thereof, and an image forming apparatus using the light emitting device.

2. Related Art

A printer as an image forming apparatus uses a light emitting device in which a plurality of light emitting elements are arranged in an array form as a head unit that forms an electrostatic latent image on an image carrier such as a photosensitive drum or the like. The head unit is generally constructed with a plurality of light emitting elements disposed in a single line along a main scanning direction.

A well-known light emitting element is an organic light emitting diode (hereinafter referred as OLED). In the light emitting element such as an OLED element, light emission intensity in particular, luminosity, changes according to the magnitude of a driving current. As a method of driving the OLED element, a PWM (pulse width modulation) method, in which a pulse width of a driving current to be supplied to the OLED element is regulated based on gradation, has been disclosed in JP-A-2004-330472 (see claim 10).

However, it is difficult to form a plurality of OLED elements in a uniform manner in an actual head unit. Accordingly, even when a driving current having a certain magnitude is respectively supplied to the plurality of OLED elements for the same period of time, the light emission intensity varies.

SUMMARY

An advantage of some aspects of the invention is to obtain uniform light emission intensity by correcting variation of luminosity of a light emitting element.

According to a first aspect of the invention, there is provided a light emitting device comprising: a plurality of light emitting elements that emit light to have luminosity depending on the magnitude of a driving signal; a plurality of holding units that are respectively disposed in the plurality of light emitting elements, and respectively hold the driving signal to maintain a magnitude regulated such that the luminosity of the plurality of light emitting elements becomes uniform; and a plurality of supply units that are respectively disposed in the plurality of light emitting elements, and supply the driving signal, which is held by the holding units to have a certain magnitude for a period of time according to a gradation of light to be emitted, to a corresponding light emitting element.

In this case, the holding units are disposed respectively corresponding to the plurality of light emitting elements, and hold the driving signal to maintain a magnitude regulated such that the luminosity of the plurality of light emitting elements becomes uniform. Since the supply units supply the driving signal held by the holding units to maintain a certain magnitude for a period of time according to a gradation of light to be emitted, the plurality of light emitting elements can emit light with a uniform brightness. Further, since it is sufficient that if the driving signal can allow the light emitting elements to emit light, either a voltage signal or a current signal is adequately used. The light emitting elements may be composed of a light emitting diode such as an organic light emitting diode, an inorganic light emitting diode, or the like. Further, the light emitting elements may be an optical head of an image forming apparatus, or may be a display device in which the plurality of light emitting elements are arranged in a matrix form.

According to a second aspect of the invention, there is provided a light emitting device comprising: a plurality of light emitting elements that emit light to have luminosity depending on the magnitude of a driving signal; a plurality of holding units that are respectively disposed in the plurality of light emitting elements, and respectively hold the driving signal to maintain a certain magnitude to be supplied to a corresponding light emitting element; a plurality of supply units that are respectively disposed in the plurality of light emitting elements, and supply the driving signal, which is held by the holding units for a period of time according to a gradation of light to be emitted, to the corresponding light emitting element; a memory unit that respectively stores signal data indicating the magnitude of the driving signal, which is regulated so that luminosity of the plurality of light emitting elements becomes uniform, for the plurality of light emitting elements; a setting unit that sequentially reads the signal data from the memory unit, and generates a setting signal based on the signal data; and an input circuit that sequentially supplies the driving signal having a magnitude depending on the magnitude of the setting signal to the holding units when the setting signal is supplied, and hold the driving signal.

It is desirable that the signal data for correcting variation of each light emitting element is stored in the memory unit, and the driving signal based on the signal data read therefrom is applied to the holding units. Specifically, the holding unit may be a volatile memory, and the memory unit may be a non-volatile memory. Since the volatile memory can be simply constructed, the light emitting device having a non-volatile memory chip may be composed of a light emitting panel, in which the plurality of light emitting elements and the plurality of holding units are integrated, and the memory unit in this case, the area of the light emitting panel can be reduced. In addition, yield of the light emitting device can be improved since it can be constructed independently from the non-volatile memory chip.

It is desirable that the setting signal is a current signal or a voltage signal. That is, the holding unit may be constructed to be a current programming type circuit or a voltage programming type circuit.

It is desirable that the aforementioned light emitting device comprises: a designated data generator that generates designated data for designating a period of time for the light emitting elements to emit light based on image data; and a plurality of light emitting controllers that are respectively disposed in the plurality of light emitting elements, and generate a light emission control signal which is valid for a period of time for the light emitting elements to emit light based on the designated data, wherein the supply unit supplies the driving signal, which is held by the holding units for a period of time for the light emission control signal to be valid, to the corresponding light emitting element.

In this case, the designated data may be composed of gradation data indicating a light emission duty ratio and location data indicating a start point of light emission duration, or may be composed of only the gradation data indicating the light emission duty ratio. In the former case, an image outline in association with adjacent dots can be smoothed.

It is desirable that the aforementioned light emitting device comprises: a measurement unit that respectively measures luminosity of the plurality of light emitting elements; and a controller that performs a process of sequentially selecting the plurality of light emitting elements, a process of controlling the light emitting controller so that the designated data that allows the selected light emitting element to emit light, a process of generating signal data so that luminosity of the selected light emitting element is in a specific range, and a process of inputting the signal data to the memory unit.

In this case, the light emitting device can generate the signal data by directly measuring the luminosity of the light emitting element. Accordingly, the signal data can be updated when a light emitting characteristic of the light emitting element changes due to variation of time elapse or variation of ambient temperature. Therefore, gradation can be accurately seen.

It is desirable that the plurality of light emitting elements are arranged in a single line or in multiple lines, the measurement unit includes at least two optical sensors disposed at both ends of the plurality of light emitting elements, and the controller measures luminosity of the selected light emitting element according to the sum of output signals output from at least the two optical sensors. In this case, since the luminosity of the light emitting elements is measured by the sum of the two optical sensors, the luminosity can be accurately measured.

It is desirable that, when usage frequencies of the plurality of light emitting elements respectively reach a predetermined usage frequency, the controller performs a process of receiving a specific data that specifies a light emitting element of which usage frequency reaches the predetermined usage frequency, a process of selecting the light emitting element of which usage frequency reaches the predetermined usage frequency based on the specific data, a process of controlling the light emitting controller so that the designated data that allows the selected light emitting element to emit light is generated, a process of generating signal data so that luminosity of the selected light emitting element is in a specific range, and a process of inputting the signal data to the memory unit in this case, since the signal data is updated when the usage frequency reaches the predetermined usage frequency, gradation can be accurately seen even if the light emission characteristic changes due to variation of time elapse. In addition, when the light emitting device is used as the optical head, the signal data may be updated while printing is not performed.

It is desirable that the aforementioned light emitting device comprises: a reading unit that reads signal data corresponding to specific data from the memory unit when the usage frequencies of the plurality of the light emitting elements respectively reach to the predetermined usage frequency, and thus the specific data, which specifies a light emitting element of which usage frequency reaches the predetermined usage frequency, is received; an operation unit that performs an operation of correcting usage frequency for the read signal data, and generates corrected signal data; and an input unit that inputs the corrected signal data to the memory unit. In this case, the signal data can be updated according to the usage frequency in the absence of the measurement unit that measures luminosity. For example, the operation unit may perform an operation defined such that the magnitude of the driving signal is 110% when a usage time of the OLED element reaches 500 hours, and the magnitude of the driving signal is 120% when the usage time reaches 1000 hours.

It is desirable that the setting unit generates the setting signal having a magnitude indicated by the signal data read from the memory unit, and the input circuit sequentially supplies the driving signal having the same magnitude as the setting signal to the holding units, and holds the driving signal to maintain the magnitude. Since the luminosity of the light emitting elements change when temperature chances even if the same current is supplied, the following temperature compensation may be carried out.

It is desirable that the light emitting device further comprises a temperature measurement unit that measures present temperature, and outputs a temperature signal, wherein: the memory unit respectively stores the signal data that indicates the magnitude of the driving signal, which is regulated such that luminosity of the plurality of light emitting elements becomes uniform at a reference temperature, for the plurality of light emitting elements; the setting unit performs an operation process for the signal data read from the memory unit according to a difference between the present temperature indicated by the temperature signal and the reference temperature, and generates the setting signal; and the input circuit sequentially supplies the driving signal having the same magnitude as the setting signal to the holding units, and holds the driving signal to maintain the magnitude. In this case, even if the reference temperature at a time when the signal data is generated is different from the present temperature at a time when the setting signal is generated, the setting signal can be generated by performing the operation process so that light emission brightness of the light emitting elements becomes uniform according to a difference between the reference temperature and the present temperature. Therefore, gradation can be accurately seen regardless of temperature variation.

It is desirable that the memory unit stores temperature data indicating the reference temperature along with the signal data, and the setting unit performs the operation process for the signal data according to a difference between the present temperature and the reference temperature indicated by the temperature data. In this case, since the memory unit stores the temperature data, there is no need for strictly managing the ambient temperature when the signal data is generated. Therefore, the signal data is easily generated. In addition, if the temperature data is generated based on the temperature signal generated by the temperature measurement unit, errors of the temperature measurement unit can be counterbalanced. For example, in the case that the reference temperature at a time when the signal data is generated coincides with the present temperature, if temperature is measured by the same temperature measurement unit, the both temperatures coincide with each other even if errors are present, whereas if it is measured by another unit, the both temperatures may not coincide with each other due to errors. Preferably, therefore, the temperature data is generated based on the temperature signal generated by the temperature measurement unit, and is then stored in the memory unit.

It is desirable that the memory unit respectively stores signal data, which indicates the magnitude of the driving signal regulated such that luminosity of the plurality of light emitting elements becomes uniform at the plurality of reference temperatures, for the plurality of light emitting elements, and the setting unit generates the setting signal by interpolating the signal data at the plurality of reference temperatures read from the memory unit according to the difference between the present temperature indicated by the temperature signal and the plurality of reference temperatures. Accordingly, since the setting signal is generated by interpolating the signal data measured in practice, the temperature compensation can be further accurately carried out.

It is desirable that the memory unit stores temperature data indicating a plurality of reference temperatures along with the signal data, and the setting unit generates the setting signal by interpolating the signal data at the plurality of reference temperatures read from the memory unit so that the luminosity of the plurality of light emitting elements becomes uniform, according to the difference between the present temperature and the plurality of reference temperatures indicated by the temperature data. In this case, since the memory unit stores the temperature data, there is no need for strictly managing the ambient temperature when the signal data is generated. Therefore, the signal data is easily generated. In addition, preferably in terms of counterbalancing measurement errors, the temperature data is generated based on the temperature signal generated by the temperature measurement unit.

It is desirable that the light emitting device further comprises a temperature compensation circuit that compensates for the setting signal according to the present temperature, wherein: the setting unit generates the setting signal having a magnitude indicated by the signal data read from the memory unit; and the input circuit sequentially supplies the driving signal, which has the same magnitude as the setting signal compensated for by the temperature compensation circuit, to the holding units, and holds the driving signal to maintain the magnitude. Accordingly, by utilizing the temperature compensation circuit, the temperature compensation can be carried out in a hardware manner, resulting in reduction of a processing load in the operation process. In addition, the temperature compensation circuit is commonly provided in the plurality of light emitting elements, resulting in a simplified structure.

It is desirable that the aforementioned light emitting device comprises: a plurality of integrated circuit chips respectively having at least one of the plurality of holding units and at least one of the plurality of supply units; a control circuit chip that supplies the setting signal; a first substrate in which the plurality of light emitting elements are arranged along a long side thereof, and the plurality of integrated circuits are arranged in a line along the plurality of light emitting elements; and a second substrate on which the control circuit chip is fixed, wherein the second substrate is connected to a short side of the first substrate, and the setting signal is supplied from the short side of the first substrate towards another short side thereof. Specifically, this is exemplified in a first embodiment of FIG. 10 to be described below. In this case, since a connection portion does not have to be disposed in the long side of the first substrate, the area of the first substrate can be reduced. In addition, since two or more integrated circuit chips are used, it is possible to manufacture the light emitting device by testing individual integrated circuit chips and assembling only good quality of elements. Accordingly, yield is increased, and cost is reduced. In addition, the second substrate includes not only a fixed substrate but also a flexible substrate. In addition, the control circuit chip may include at least the setting unit, and the memory unit may be disposed on the second substrate, while the temperature measurement unit may be disposed on the first substrate. Alternatively, the control circuit chip may include at least the setting unit, and the memory unit and the temperature measurement unit may be disposed on the second substrate.

It is desirable that the aforementioned light emitting device comprises: a plurality of integrated circuit chips respectively having at least one of the plurality of holding units and at least one of the plurality of supply units; a control circuit chip that supplies the setting signal; a first substrate in which the plurality of light emitting elements are arranged along a long side thereof, and the plurality of integrated circuits are arranged in a line along the plurality of light emitting elements; and a second substrate on which the control circuit chip is fixed, wherein: the second substrate is connected to a center portion of the long side of the first substrate; and the setting signal is supplied from the center portion of the long side of the first substrate towards not only a short side thereof but also another short side thereof. Specifically, this is exemplified in a second embodiment of FIG. 11 to be described below. In this case, since the setting signal can be supplied so as to branch off to left and right paths from the center portion of the first substrate, delay times of a variety of setting signals can be reduced. In addition, the control circuit chip may include at least the setting unit, and the memory unit may be disposed on the second substrate, while the temperature measurement unit may be disposed on the first substrate. Alternatively, the control circuit chip may include at least the setting unit, and the memory unit and the temperature measurement unit may be disposed on the second substrate.

It is desirable that a flexible substrate, on which a wire for transmitting the setting signal is formed, is included between at least one of the adjacent integrated circuit chips. By utilizing the flexible substrate, the delay time of the setting signal can be further reduced.

According to a third aspect of the invention, there is provided an image forming apparatus comprising the aforementioned light emitting device; and an image carrier on which an electrostatic latent image is formed by light respectively irradiated from the plurality of light emitting elements. Examples of the image forming apparatus include a printer, a copy machine, and a multi-function printer.

According to a fourth aspect of the invention, there is provided a method of driving a light emitting device having a plurality of light emitting elements that emit light to have luminosity depending on the magnitude of a driving signal, the method comprising: holding the driving signal to maintain a magnitude regulated such that luminosity of the plurality of the light emitting element becomes uniform, respectively, for the plurality of the light emitting elements; and supplying the driving signal, which is held for a period of time according to a gradation of light to be emitted so as to maintain the magnitude, to a corresponding light emitting element respectively for the plurality of light emitting elements. Accordingly, the driving signal is held to maintain a magnitude regulated such that luminosity of the plurality of the light emitting element becomes uniform, respectively, and the driving signal, which is held for a period of time according to a gradation of light to be emitted so as to maintain the magnitude, is supplied to a corresponding light emitting element respectively for the plurality of light emitting elements. Therefore, it is possible to allow the plurality of light emitting elements to emit light with a uniform brightness.

According to a fifth aspect of the invention, there is provided a method of driving a light emitting device having: a plurality of light emitting elements that emit light to have luminosity depending on the magnitude of a driving signal; a plurality of holding units that are respectively disposed in the plurality of light emitting elements, and respectively hold the driving signal to maintain a magnitude regulated such that the luminosity of the plurality of light emitting elements becomes uniform; a plurality of supply units that are respectively disposed in the plurality of light emitting elements, and supply the driving signal, which is held by the holding units to have a certain magnitude for a period of time according to a gradation of light to be emitted, to a corresponding light emitting element; and a memory unit that respectively stores signal data indicating the magnitude of the driving signal, which is regulated so that luminosity of the plurality of light emitting elements becomes uniform, respectively, for the plurality of light emitting elements, the method comprising: sequentially reading the signal data from the memory unit when power is supplied; generating a setting signal based on the read signal data; and sequentially supplying the driving signal having a magnitude depending on the magnitude of the generated setting signal to the holding units, and holding the driving signal to maintain the magnitude. Accordingly, since the magnitude of the driving signal is input to the holding units whenever power is supplied, the holding units may be composed of a non-volatile memory.

It is desirable that the method of driving the aforementioned light emitting device comprises: sequentially selecting the plurality of light emitting elements, allowing the selected light emitting element to emit light; measuring luminosity of the selected light emitting element; generating signal data so that the luminosity of the selected light emitting element is in a specific range; and inputting the generated signal data to the memory unit. In this case, since the memory unit can store the signal data of which luminosity is in a specific range, the luminosity of each light emitting element can be corrected so as to become uniform.

It is desirable that the method of driving the aforementioned light emitting device comprises, after the signal data is input to the memory unit,: respectively determining whether usage frequencies of the plurality of light emitting elements reach a predetermined usage frequency, and specifying the light emitting element of which usage frequency reaches the predetermined usage frequency; allowing the specified light emitting element to emit light; measuring luminosity of the specified light emitting element; generating signal data so that the luminosity of the specified light emitting element is in a specific range; and inputting the generated signal data to the memory unit. In this case, since the signal data is updated when the usage frequency reaches the predetermined usage frequency, gradation can be accurately seen even if the light emission characteristic changes due to variation of time elapse.

It is desirable that the method of driving the aforementioned light emitting device comprises, after the signal data is input to the memory unit,: respectively determining whether usage frequencies of the plurality of light emitting elements reach a predetermined usage frequency, and specifying the light emitting element of which usage frequency reaches the predetermined usage frequency; reading signal data of the specified light emitting element from the memory unit; performing an operation of correcting usage frequency for the read signal data, and generating a corrected signal data; and inputting the corrected signal data to the memory unit. In this case, the signal data can be updated according to the usage frequency in the absence of the measurement unit that measures luminosity.

It is desirable that the setting signal has a magnitude indicated by the signal data; and the driving signal sequentially supplied to the holding units has the same magnitude as the setting signal. Since the luminosity of the light emitting elements change when temperature changes even if the same current is supplied, the temperature compensation may be carried out.

According to a sixth aspect of the invention, there is provided a method of driving a light emitting device having: a plurality of light emitting elements that emit light to have luminosity depending on the magnitude of a driving signal; and a memory unit that respectively stores signal data indicating the magnitude of the driving signal, which is regulated so that luminosity of the plurality of light emitting elements becomes uniform at a reference temperature, respectively, for the plurality of light emitting elements, the method comprising: sequentially reading the signal data from the memory unit, and generating a setting signal for the read signal data by performing an operation process according to a difference between the present temperature and the reference temperature; respectively holding the driving signal to maintain the magnitude based on the setting signal for the plurality of light emitting elements; and supplying the driving signal, which is held for a period of time according to a gradation of light to be emitted so as to maintain the magnitude, to the plurality of light emitting elements. In this case, even if the reference temperature at a time when the signal data is generated is different from the present temperature at a time when the setting signal is generated, the setting signal can be generated by performing an operation process so that light emission brightness of the light emitting element becomes uniform according to a difference between the reference temperature and the present temperature. Therefore, gradation can be accurately seen regardless of temperature variation.

It is desirable that the memory unit stores signal data, which indicates the magnitude of the driving signal regulated such that luminosity of the plurality of light emitting elements becomes uniform at the plurality of reference temperatures, respectively, for the plurality of light emitting elements, and in a process of generating the setting signal, as the operation process, the setting unit generates the setting signal by interpolating the signal data at the plurality of reference temperatures read from the memory unit according to the difference between the present temperature and the plurality of reference temperatures. In this case, since the setting signal is generated by interpolating the signal data measured in practice, the temperature compensation can be further accurately carried out.

BRIEF DESCRIPTION OF THE DRAWINGS

The invention will be described with reference to the accompanying drawings, wherein like numbers reference like elements.

DESCRIPTION OF EXEMPLARY EMBODIMENTS

Figure 1:
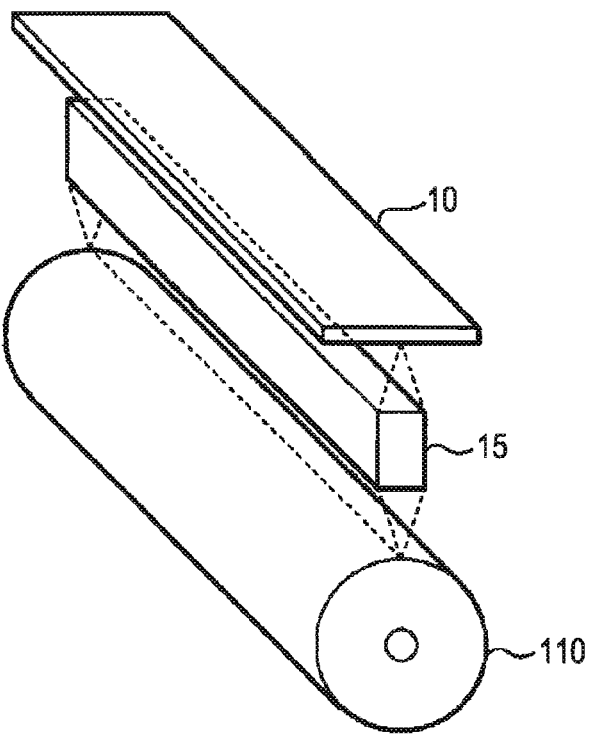
FIG. 1 is a perspective view showing a portion of an image forming apparatus using a light emitting device of the invention.

Now, exemplary embodiments of the invention will be described with reference to the accompanying drawings. Here, like reference numerals in the drawings denote like elements.

First Embodiment

FIG. 1 is a perspective view showing a portion of an image forming apparatus using a light emitting device according to a first embodiment of the invention. Referring to FIG. 1, the image forming apparatus includes a light emitting device 1, a light condense lens array 15, and a photosensitive drum 110. The light emitting device 1 includes a plurality of light emitting elements disposed in a single line or in multiple lines in an array form. These light emitting elements emit light in a selective manner according to an image to be printed on a recording medium such as a sheet of paper. For example, an organic light emitting diode element (hereinafter referred to as an OLED element) is used as a light emitting element. The light condense lens array 15 is disposed between the light emitting device 1 and the photosensitive drum 110. The light condense lens array 15 includes a plurality of gradient index lenses which are arranged in an array form, while each optical axis thereof faces the light emitting device 1. For example, the light condense lens array 15 may be a SLA (SELFOC lens array) that can be obtained from Nippon Sheet Class. SELFOC is a trademark of Nippon Sheet Class. Light emitted from each light emitting element of the light emitting device 1 is transmitted through each of the gradient index lenses of the light condense lens array 15, and reaches the surface of the photosensitive drum 110. By this light exposure process, a latent image of a desired image is formed on the surface of the photosensitive drum 110.

Figure 2:
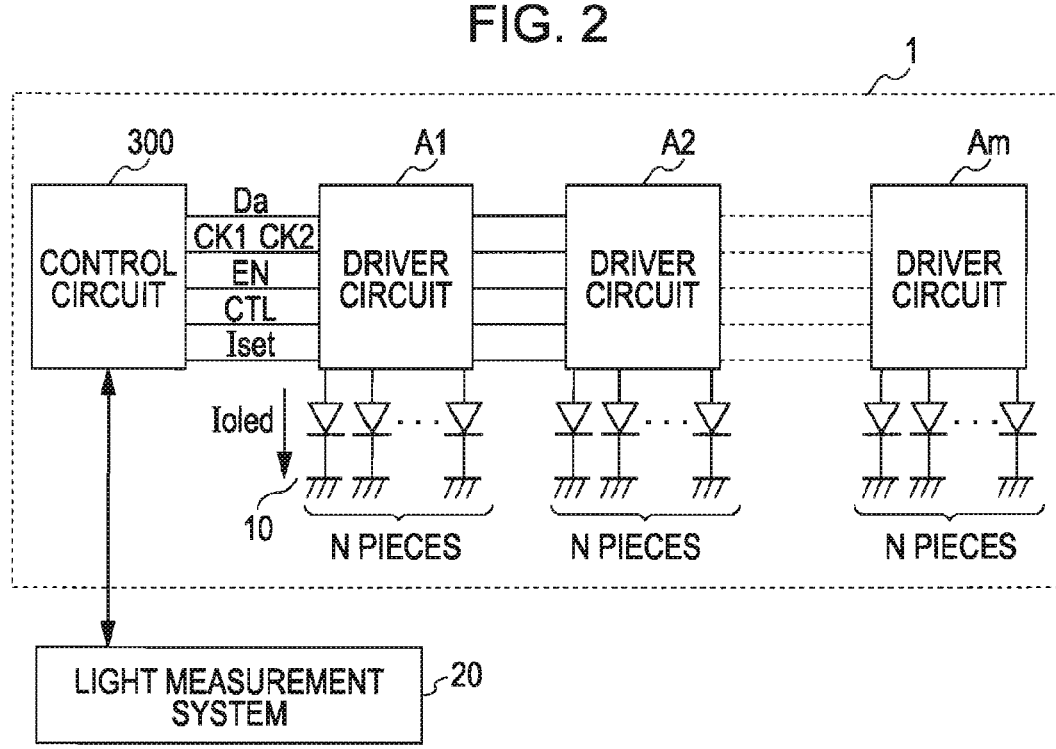
FIG. 2 is a block diagram showing a structure of a light emitting device and a peripheral structure thereof according to a first embodiment of the invention.

FIG. 2 is a block diagram showing a structure of a light emitting device 1 and a peripheral structure thereof according to a first embodiment of the invention. Referring to FIG. 2, the light emitting device 1 includes m driver circuits A1 to Am, and a control circuit 300 controlling the driver circuits A1 to Am. The driver circuits A1 to Am are respectively connected to n OLED elements 10. The control circuit 300 generates a variety of control signals to control the driver circuits A1 to Am. In the light emitting device 1, the OLED elements 10 are respectively driven by using a PWM method. When the PWM method is used, light emitting power of each OLED element 10 is obtained by multiplying the magnitude of the driving current Ioled and a light emitting duty ratio. In the present embodiment, variation of a light emitting characteristic of the plurality of OLED elements 10 is compensated for by regulating the magnitude of the driving current Ioled, so as to allow the OLED elements 10 to emit light with a desired gradation.

The control circuit 300 includes a nonvolatile memory (to be described below). The current data, which designates the magnitude of the driving current Ioled of each of the OLED elements 10, is stored in the memory unit. The control circuit 300 can be connected to a light measurement system (a measurement unit) 20. The light measurement system 20 individually measures luminosity of each of the OLED elements 10. According to the measurement result, the control circuit 300 stores the current data in which the light emitting characteristic of each of the OLED elements 10 is corrected.

Figure 3:
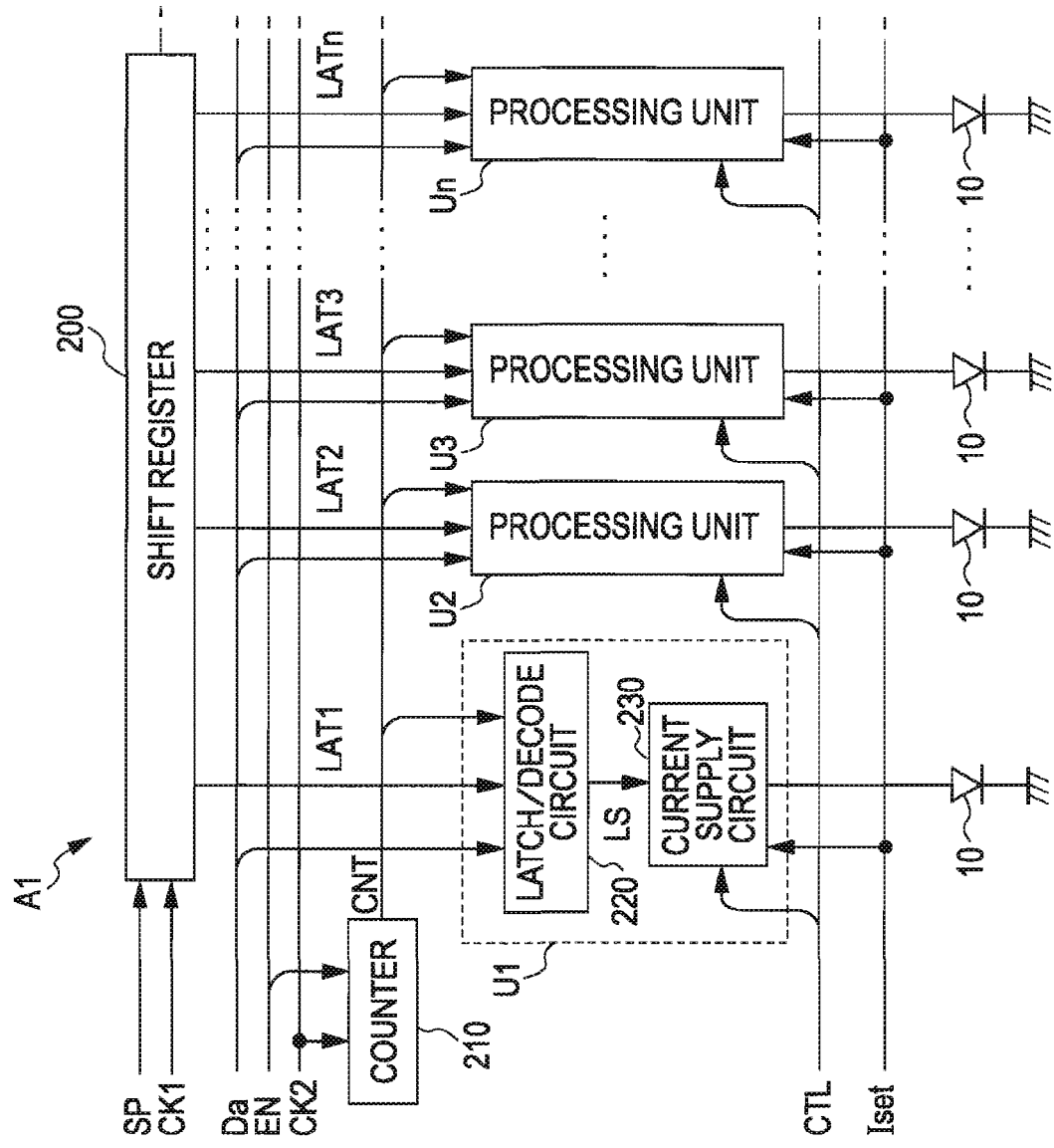
FIG. 3 is a block diagram of a driver circuit used in the same device as above.

FIG. 3 is a block diagram of the driver circuit A1. The rest of the driver circuits A2 to Am are constructed in the same manner as the driver circuit A1. The driver circuit A1 drives the n OLED elements 10 by using the PWM method. That is, according to light emission intensity (light emission power) that has to be emitted by the OLED elements 10, a light emitting duty ratio is regulated. The light emitting duty ratio is defined by the sum of a light-up duration and a light-off duration.

Figure 4:
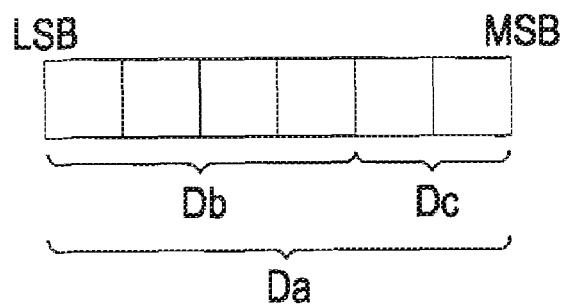
FIG. 4 shows a data structure of designated data Da generated by a control circuit used in the same device as above.

N processing units U1 to Un determine an on-time of the driving circuit Ioled supplied to the OLED elements 10 and its timing according to a variety of control signals such as designated data Da supplied from the control circuit 300. In this case, as shown in FIG. 4, the designated data Da is a 6-bit signal, in which gradation data Db indicating gradation to be displayed is allocated to the lower 4 bits, and location data Dc is allocated to the upper 2 bits. For example, when the gradation data Db designates a maximum brightness, a light emission duty ratio is 100%, and when the gradation data Db designates 80% of the maximum brightness, the light emission duty ratio is 80%. Here, in the case that light is initially emitted in the case that light emission brightness is 100%, if it is assumed that a start point is defined as a starting time of light emission, and an end point is defined as an ending time of light emission, in order to obtain a light emission duty ratio of 80%, the end point may be defined as a time point at which 80% of a total of time duration elapses since light has been initially emitted at the start point. Alternatively, lighting up may be initially carried out at a time point where 20% of a total of time duration elapses since the start point has begun, and lighting off may be carried out at the end point. The location data Dc is defined as data that indicates beginning of light-up duration and ending of light-off duration, and is designated by the main body of the image forming apparatus. By the use of the location data Dc, light emitting timing can be regulated, and thus outline of a printed image can be smoothed.

Figure 5:
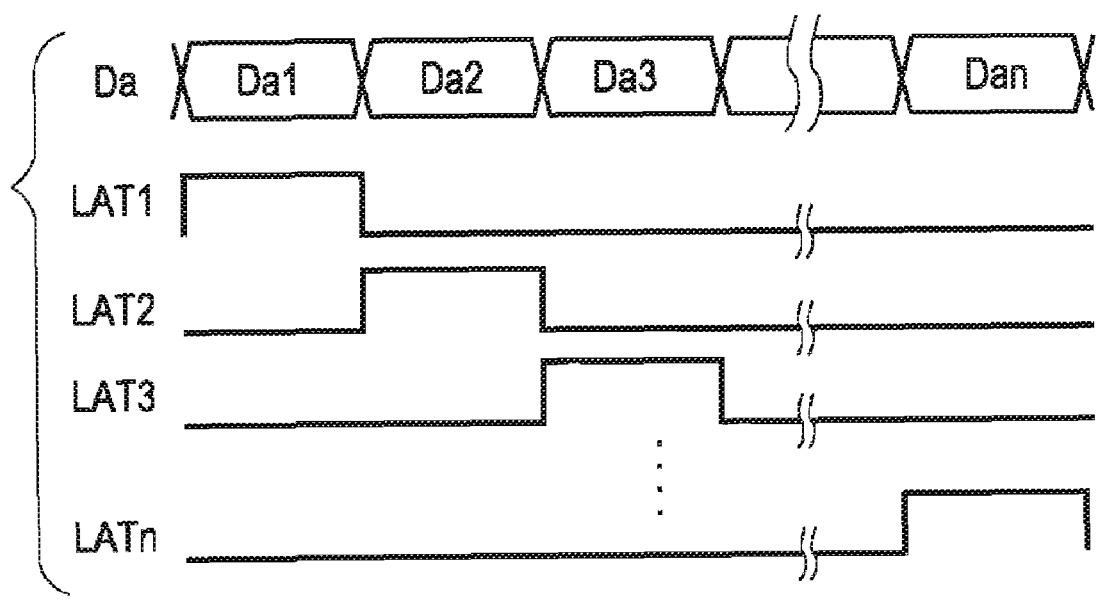
FIG. 5 is a timing chart showing a relationship between latch signals LAT1 to LATn generated by a shift register used in the same device as above and the designated data Da.

A shift register 200 shifts a starting pulse SP in a sequential manner in response to a first clock signal CK1, so as to generate latch pulses LAT1 to LATn. Referring to FIG. 5 the latch pulses LAT1 to LATn become high level (active) in an exclusive manner. Each of the processing units U1 to Un, as shown in FIG. 3, includes a latch/decode circuit 220 (a light emission controller) and a current supply circuit 230 (a supply unit, or an input circuit). The latch/decode circuit 220 of each of the processing units U1 to Un sequentially receive designated data Da (Da1, Da2, . . . , and Dan) in response to the latch pulses LAT1 to LATn. In this case, an 8-bit counter 210 supplies count data CNT obtained by counting a second clock signal CK2 to the latch/decode circuit 220 of each of the processing units U1 to Un. The latch/decode circuit 220 determines a bit to be used from the 8-bit count data CNT by using location data Dc, and generates a light emission control signal LS based on the determined bit and the gradation data Db. The light emission control signal LS is active for a period of time according to a gradation indicated by the gradation data Db, so that a starting point of an active duration is regulated based on the location data Dc.

Figure 6:
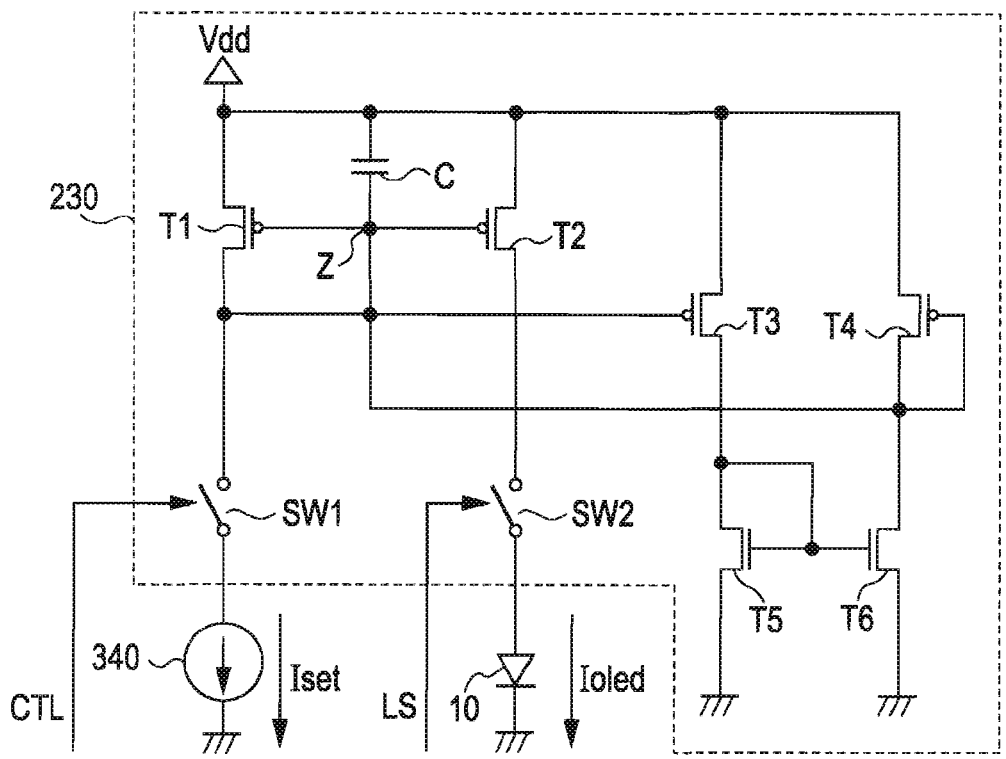
FIG. 6 is a circuit diagram showing a detailed structure of a current supply circuit used in the same device as above.

FIG. 6 is a detailed circuit diagram of the current supply circuit 230. Referring to FIG. 6, transistors T1 and T2 constitute a current mirror circuit, and transistors T3 to T6 function as holding units that hold an electrical potential at a node Z along with a capacitor C. When switches SW1 and SW2 are simultaneously turned on, the magnitude of the driving current Ioled coincides with that of the set current Iset that flows through a current source 340 of a control circuit 300 to be described below. Further, in the case that the set current Iset flows when the switch SW1 is turned on, an electric potential depending on the set current Iset is held by the capacitor C. Since the electric potential is held even when the switch SW1 is turned off, if the switch SW2 is thereafter turned on, the driving current Ioled having the same magnitude as the set current Iset is supplied to the OLED elements 10 via the transistor T2. That is, by supplying the set current Iset to the current supply circuit 230, the magnitude of the driving current Ioled to be supplied to the OLED elements 10 can be stored in the capacitor C.

The magnitude of the held driving current Ioled is cleared when a power voltage Vdd is blocked. As a result, when power is supplied, the magnitude of the driving current Ioled has to be stored in the capacitor C by supplying the driving current Ioled to the current supply circuit 230. Accordingly, the holding units function as volatile memories. If a non-volatile memory is used to store the magnitude of the driving current Ioled, there is a need for storing the magnitude of the driving current Ioled in the form of digital data. To achieve this, circuit scale of the current supply circuit 230 becomes large. In the present embodiment, since the magnitude of the driving current Ioled is held by the capacitor C as an analog signal, the circuit scale can be significantly decrease.

The on/off of the switch SW1 is controlled by a set control signal CTL supplied from the control signal 300. When the set control signal CTL becomes active (high level), the switch SW1 is turned on, whereas when inactive (low level), the switch SW1 is turned off. As described below, the set control signal CTL becomes active when in a measuring mode in which light emission intensity (luminosity) of each of the OLED elements 10 is individually measured, and in an initial mode in which the magnitude of the driving current Ioled of each of the OLED elements 10 is set when power is supplied, whereas the set control signal CTL becomes inactive when in a normal operation mode for normal operating. On the other hand, the switch SW2 is controlled in response to the light emission control signal LS supplied from the latch/decode circuit 220. Further, when the light emission control signal LS becomes active (high level), the switch SW2 is turned on, whereas when inactive (low level), the switch SW2 is turned off.

Figure 7:
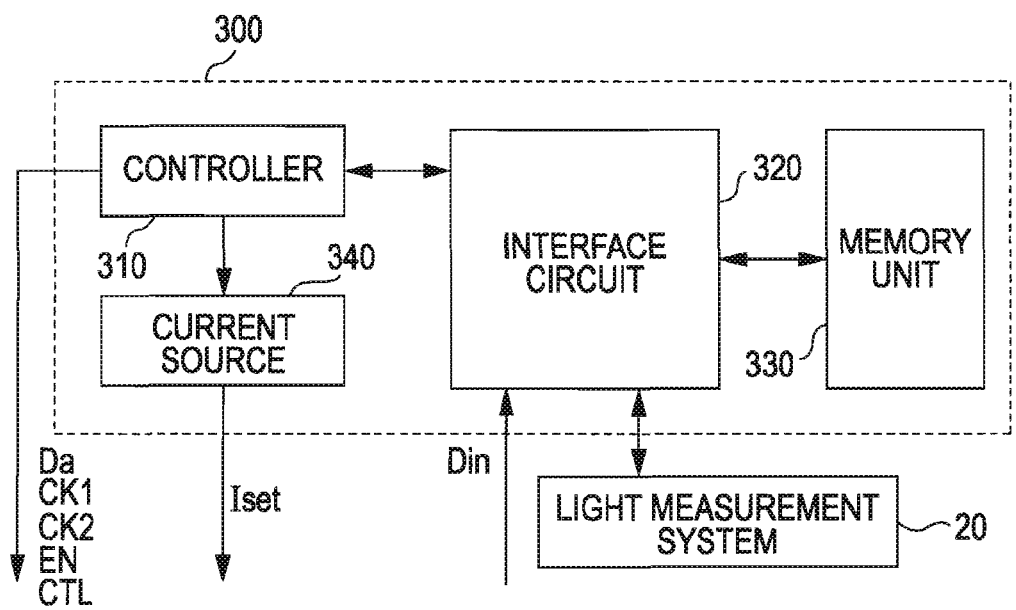
FIG. 7 is a block diagram of a control circuit used in the same device as above.

FIG. 7 is a detailed block diagram of the control circuit 300. The control circuit 300 includes a controller 310 (a setting unit, a designated data generating unit, or a control unit), an interface circuit 320, a memory unit (a storage unit) 330, and a current source 340. The controller 310 functions as a main controller that entirely controls the light emitting device 1. The memory unit 330 is composed of a writable non-volatile memory. The magnitude of the driving current Ioled to be supplied to each of the OLED elements 10 is stored in the memory unit 330 as current data. The current data is input thereto when in the measuring mode, and is read when in the initial mode. When the read current data is supplied to the controller 310, the controller 310 sends a command to the current source 340. The current source 340 changes the magnitude of the set current Iset according to the command received from the controller 310, and outputs the result to each of the processing units U1 to Un. When in the normal operation mode, if image data Din is supplied from a printer main body, the image data Din is supplied to the controller 310 via the interface circuit 320. The controller 310 generates the designated data Da composed of the gradation data Db and the location data Dc based on the image data Din, and supplies these data to each of the driver circuits A1 to Am. Further, the controller 310 generates the first clock signal CK1, the second clock signal CK2, an enable signal EN, and the set control signal CTL, and outputs these control signals to the driver circuits A1 to Am.

Figure 8:
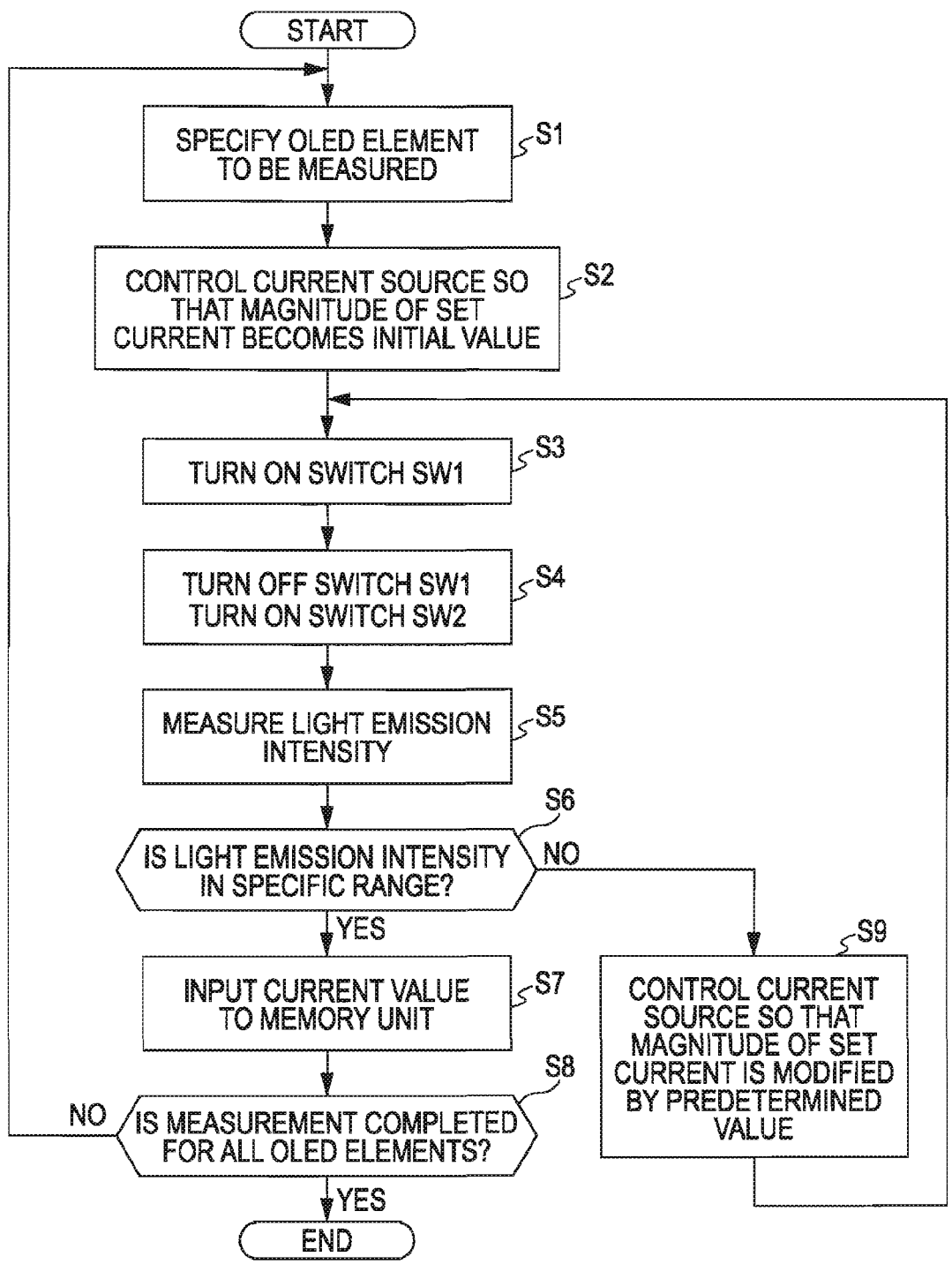
FIG. 8 is a flowchart showing an operation of the same device as above when in a measuring mode.

FIG. 8 is a flowchart showing operations of the light emitting device 1 and the light measurement system 20 when in the measuring mode. In the measuring mode, the controller 310 specifies an OLED element to be measured (step S1). For example, the OLED element 10 disposed at the far left may be specified for the first measuring. Next, the controller 310 controls the current source 340 to allow the set current Iset to be an initial value (step S2), so that the set control signal CTL corresponding to the specific OLED element 10 becomes active (high level). Accordingly, the switch SW1 of the current supply circuit 230 corresponding to the specified OLED element 10 is turned on, and thus an initial value of the initial set current Iset is input to the capacitor C of the current supply circuit 230 (step S3). Next, the controller 310 inactivates the set control signal CTL, and generates and outputs the designated data Da so that the switch SW2 corresponding to the specified OLED element 10 is turned on while the switch SW1 is turned off (step S4). Accordingly, the initial driving current Ioled is supplied to the specified OLED element 10, and thus a corresponding OLED element 10 emits light. In this case, other OLED elements 10 are turned off.

Thereafter, the light measurement system 20 measures light emission intensity (luminosity) of the specified OLED element 10 (step S5), and determines whether the light emission intensity is in a specific range or not (step S6). The specific range is a permissive variation range for light emission intensity of a head unit. If the light emission intensity is out of the specific range, step S9 is performed, and the light measurement system 20 sends information indicating that the OLED element 10 is not desirable in use to the controller 310 via the interface circuit 320. Subsequently, the controller 310 controls the current source 340 so that the magnitude of the set current Iset is modified by a predetermined value (step S9). Thereafter, operation returns to step 33. By repeating this modification, if the light emission intensity of the specified OLED element 10 is in the specific range, the light measurement system 20 sends information indicating that the OLED element 10 is desirable in use to the controller 310 via the interface circuit 320. Subsequently, the controller 310 inputs current data indicating the magnitude of the present set current Iset to the memory unit 330 via the interface circuit 320. Thereafter, the controller 310 determines whether measurement is completed for all of the OLED elements 10 (step S8). If determination condition of step S8 is not satisfied, the operation returns to step S1 under the control of the controller 310, so as to repeat the above steps up to step S8. If measurement is completed for all of the OLED elements 10, the measuring mode is completed. Accordingly, current data, in which variation of a light emitting characteristic of each of the OLED elements 10 is corrected, is stored in the non-volatile memory 330. The aforementioned measurement is performed in a factory where the light emitting device 1 is manufactured.

Figure 9:
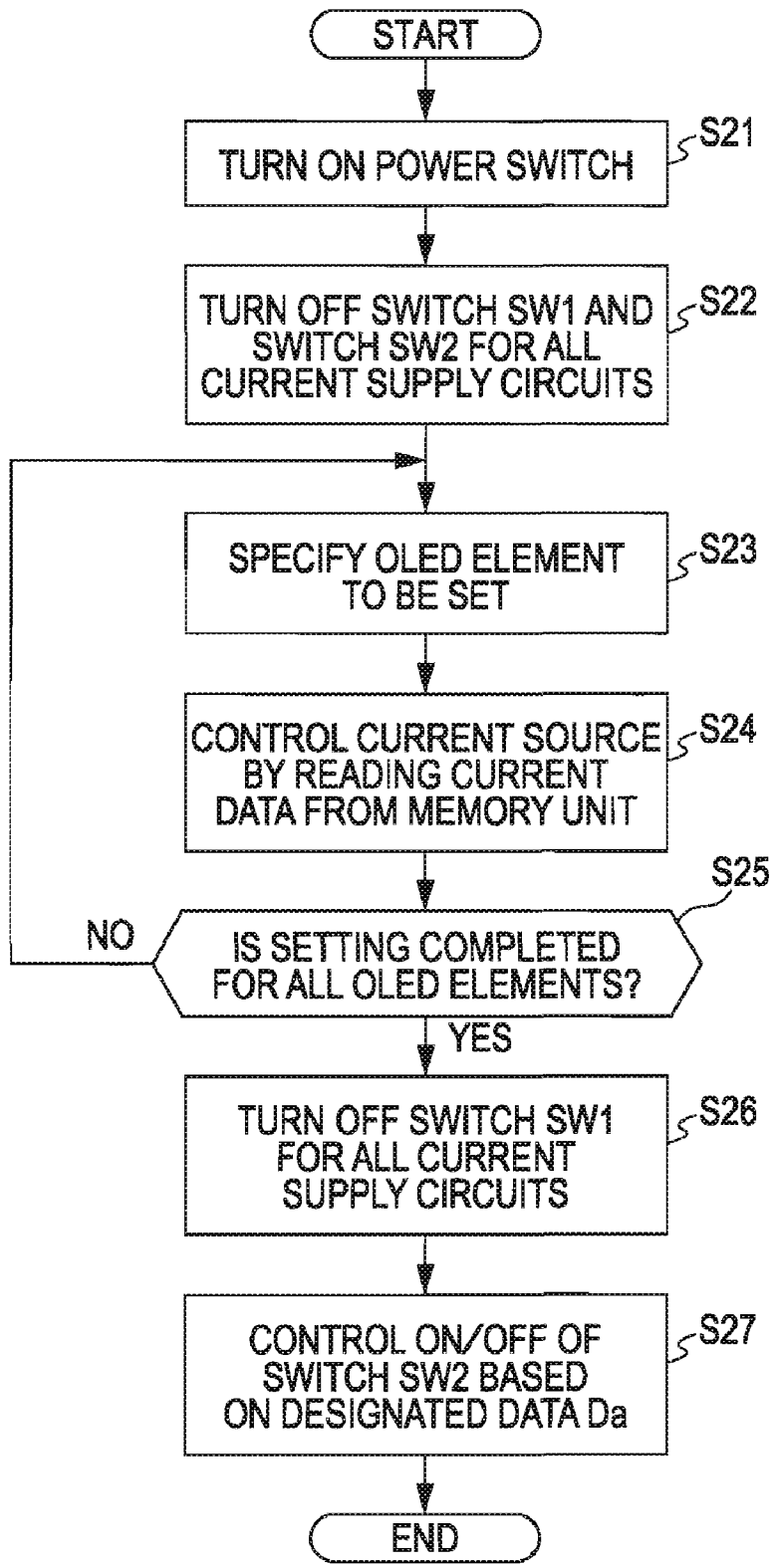
FIG. 9 is a flowchart of an operation when the same device as above is in an initial mode and a normal operation mode.

FIG. 9 is a flowchart showing an operation of the light emitting device 1 when in the initial mode and the normal operation mode. First, when a power switch of the image forming apparatus is turned on, and thus power is supplied to the light emission device 1, then the initial mode begins (step S21). The controller 310 generates the set control signal CTL so that the switch SW1 is tuned off for all of the current supply circuits 230, while the designated data Da is set so that the switch SW2 is turned off for all of the current supply circuits 230 (step S22).

Next, the controller 310 specifies an OLED element 10 to be set, and generates the designated data Da so that only the switch SW2 corresponding to the OLED element 10 is turned on while generating the set control signal CTL so that only the switch SW1 corresponding to the OLED element 10 is turned on (step S23). For example, the OLED element 10 disposed in the far left may be specified. Thereafter, the controller 310 reads current data corresponding to the OLED element 10 from the memory unit 330, and controls the current source 340 so that the set current Iset has a magnitude indicated by the current data (step S24). Accordingly, the current supply circuit 230 inputs the driving current Ioled having a certain magnitude into a holding unit of the current supply circuit 230 with respect to the OLED element 10. In other words, the setting of the driving current Ioled that has to be supplied to the OLED element 10 is completed.

Next, the controller 310 determines whether the setting is completed for all of the OLED elements 10 (step S25), and steps S23 to S25 are repeated until it is completed. When the process of inputting the driving current Ioled of a certain magnitude to the holding unit of the current supply circuit 230 is completed for all of the OLED elements 10, the initial mode is ended, and the normal operation mode begins.

When in the normal operation mode, the controller 310 inactivates the set control signal CTL to be supplied to all of the current supply circuit 230, so that all of the switches SW1 are turned off (step S26). Next, the controller 310 generates and outputs the designated data Da based on the image data Din (step S27). Accordingly, the on/off of each of the switches SW2 is controlled, and the driving current Ioled having an individually determined magnitude flows to the designated data Da for a predetermined time period.

As described above, in the present embodiment, the magnitude of each driving current Ioled is stored in the non-volatile memory 330 in advance, and it is read when operations are performed, so as to be maintained in the current supply circuit 230 which is disposed depending on each of the OLED elements 10. Since a non-volatile memory is appropriately used as the holding unit, circuit configuration of the current supply circuit 230 can be simplified. Further, when the plurality of OLED elements 10 are dynamically driven, electrodes of the OLED elements 10 have to be patterned.

However, since the OLED elements 10 are constructed by using an organic EL material, a high technology such as a deposition process is necessary. According to the present embodiment, the OLED elements 10 can be simply manufactured since negative electrodes of the OLED elements 10 can be commonly used. In addition, since the current supply circuit 230 uses a PWM method in which light emission power is controlled by an on-time of the driving current Ioled, the OLED elements 10 which are not appropriate for an operation of emitting light with high intensity for a short time period can be used as a light source of the light emitting device 1.

In the aforementioned embodiment, each driver circuit A1 to Am and the control circuit 300 are preferably composed of separate IC chips. Hereinafter, exemplary embodiments of the light emitting device 1 will be described in detail with reference to FIGS. 10 to 12. Although six driver circuits A1 to A6 are used in these embodiments, the invention is not limited to the number of IC chips.

Figure 10:
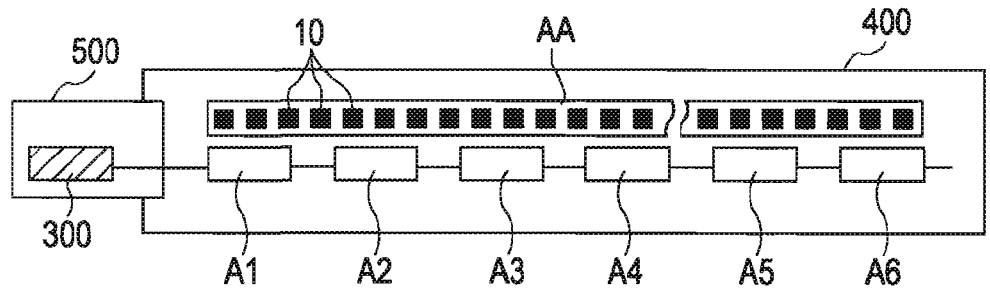
FIG. 10 shows a case where each of driver circuits A1 to Am and a control circuit 300 are constructed with separate IC chips according to a detailed embodiment of the invention.

A first embodiment of the invention is shown in FIG. 10. The light emitting device 1 includes a light emitting panel 400 and a flexible substrate 500. A control circuit 300 is disposed on the flexible substrate 500 (a second substrate) by using a COF (Chip On Film) scheme. A plurality of OLED elements 10 are formed on a light emission area AA of the light emitting panel 400. Specifically, a positive electrode, a light emitting material, and a negative electrode are laminated on a glass substrate (a first substrate), and a top portion thereof is sealed by using a seal member, thereby forming a connection wire. Due to this simply structure, manufacturing cost can be decreased. Further, since test is easy, productivity can be increased.

Six driver circuits A1 to A6 are arranged on the light emitting panel 400 by using a COG (Chip On Glass) scheme. Further, the flexible substrate 500 is connected to a short side of the light emitting panel 400, and a variety of control signals are supplied through a wire L1 formed on the light emitting panel 400. In this case, since the IC chip and the light emitting panel 400 are independently manufactured, they may be respectively tested, and a finished product can be manufactured by assembling only good quality of elements. Accordingly, yield is increased, and cost is reduced.

Further, in the present embodiment, a signal wire used to supply the designated data Da, a power wire, and a ground wire are embedded in the driver circuits A1 to A6 which are integrated into an IC chip. These wires may be formed outside the IC chip. However, an internal wire of the IC chip may be used, with at least one of the wires being omitted. Accordingly, an area occupied by the wires formed outside the IC chip can be reduced, and thus the length of the short side of the light emitting panel 400 can be shortened. As a result, cost can be reduced by increasing the number of substrates of the light emitting panel 400 which is obtained when cutting a sheet of large sized glass plate constituting a base of the light emitting panel 400. In addition, since the length of the short side thereof can be shortened, the light emitting device 1 can be easily assembled into the image forming apparatus.

Figure 11:
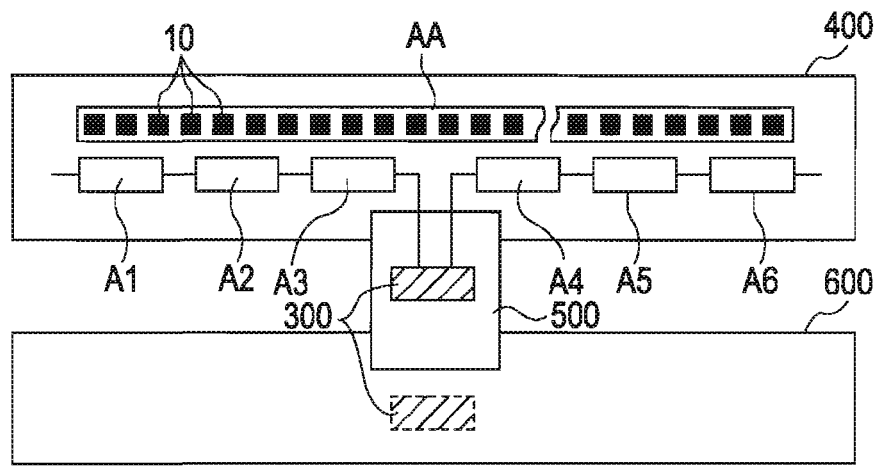
FIG. 11 shows a case where each of driver circuits A1 to Am and a control circuit 300 are constructed with separate IC chips according to another detailed embodiment of the invention.

A second embodiment of the invention is shown in FIG. 11. The light emitting device 1 includes the light emitting panel 400, the flexible substrate 500, and a control substrate 600. In this case, the control circuit 300 may be disposed on the flexible substrate 500 (the second substrate), or on the control substrate 600 (the second substrate). Further, the flexible substrate 500 is connected near to a center portion of a long side of the light emitting panel 400, and a variety of control signals are supplied from the control circuit 300 so as to branch off to left and right paths via the wires. According to this layout, delay times of the variety of control signals can be reduced.

Figure 12:
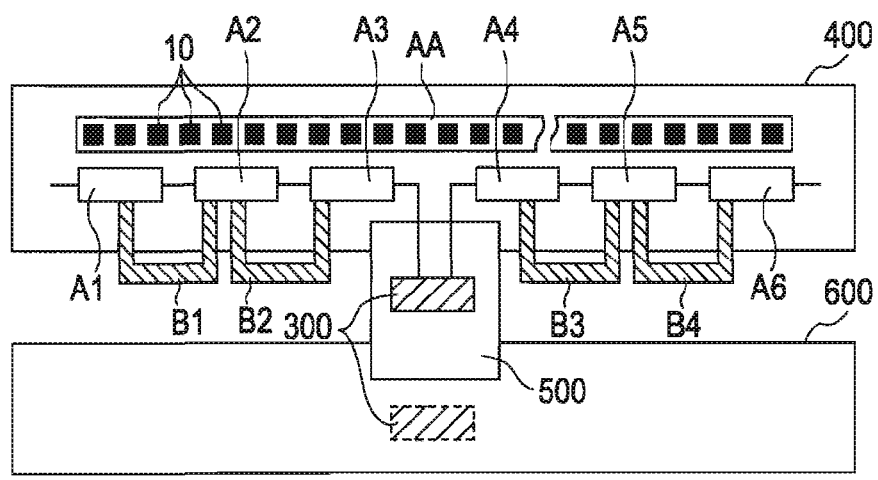
FIG. 12 shows a case where each of driver circuits A1 to Am and a control circuit 300 are constructed with separate IC chips according to still another detailed embodiment of the invention.

A third embodiment of the invention is shown in FIG. 12. The light emitting device 1 includes the light emitting panel, 400, the flexible substrate 500, and the control substrate 600. Here, the control circuit 300 may be disposed on the flexible substrate 500 or the control substrate 600. The third embodiment is the same as the second embodiment except that adjacent driver circuits are connected by using flexible substrates B1 to B4. By means of the flexible substrates B1 to B4, wire capacitance can be reduced, and thus fast scanning can be achieved. The third embodiment is a modification of the second embodiment. Similarly, in the first embodiment, the adjacent driver circuits may be connected by using the flexible substrates B1 to B4.

Second Embodiment

Now, a light emitting device 2 according to a second embodiment of the invention will be described.

Figure 13:
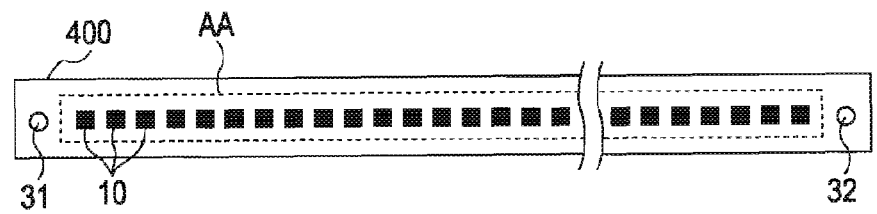
FIG. 13 is a plan view of a light emitting panel according to a second embodiment of the invention.

FIG. 13 is a plan view of a light emitting panel 400 used in the light emitting device 2. The driver circuits A1 to Am are omitted in FIG. 13. Referring to FIG. 13, in the light emitting panel 400, OLED elements 10 are formed on a light emission area AA, and optical sensors (measurement units) 31 and 32 are formed at both ends of the light emitting panel 400. The optical sensors 31 and 32 output a measurement signal depending on light quantity of incident light. In this embodiment, the optical sensors 31 and 32 are composed of photodiodes, and output a current depending on light quantity (light intensity) as a measurement signal.

Figure 14:
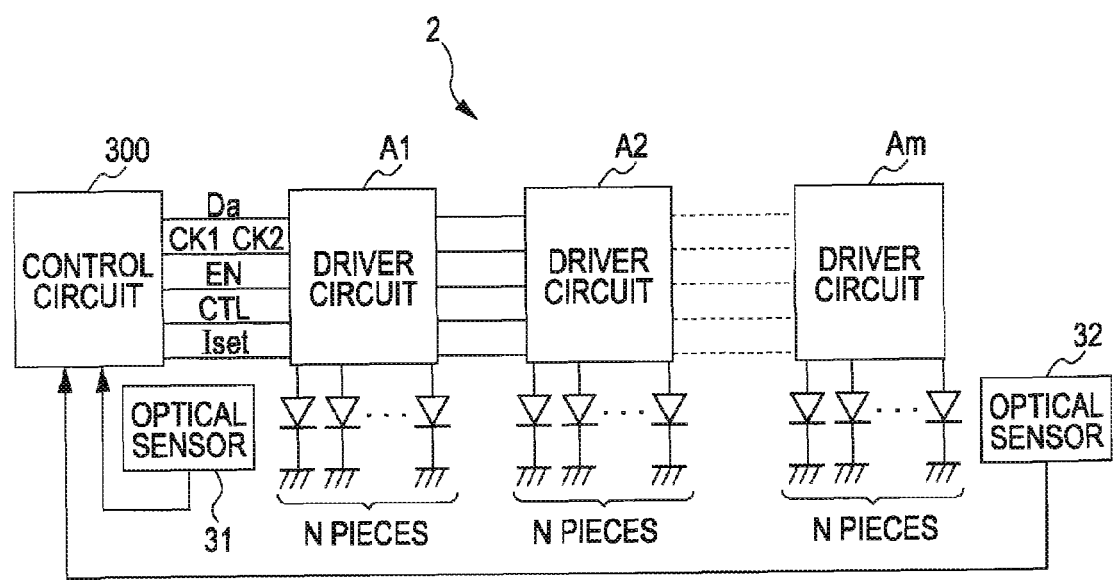
FIG. 14 is a block diagram showing a structure of a light emitting device according to a second embodiment of the invention.

FIG. 14 is a block diagram of the light emitting device 2. The light emitting device 2 has the same structure as the light emitting device 1 of the first embodiment of FIG. 2, except that a control circuit 301 is used instead of the control circuit 300, and the optical sensors 31 and 32 are added. Therefore, each driver circuit has the structure of FIG. 3, and each processing unit U1 to Un of the driver circuit includes the latch/decode circuit 200 and the aforementioned current control circuit 230 of FIG. 6. Since the light emitting device 2 includes the optical sensors 31 and 32, current data can be arbitrarily generated without having to use the light measurement system 20 of the first embodiment.

Figure 15:
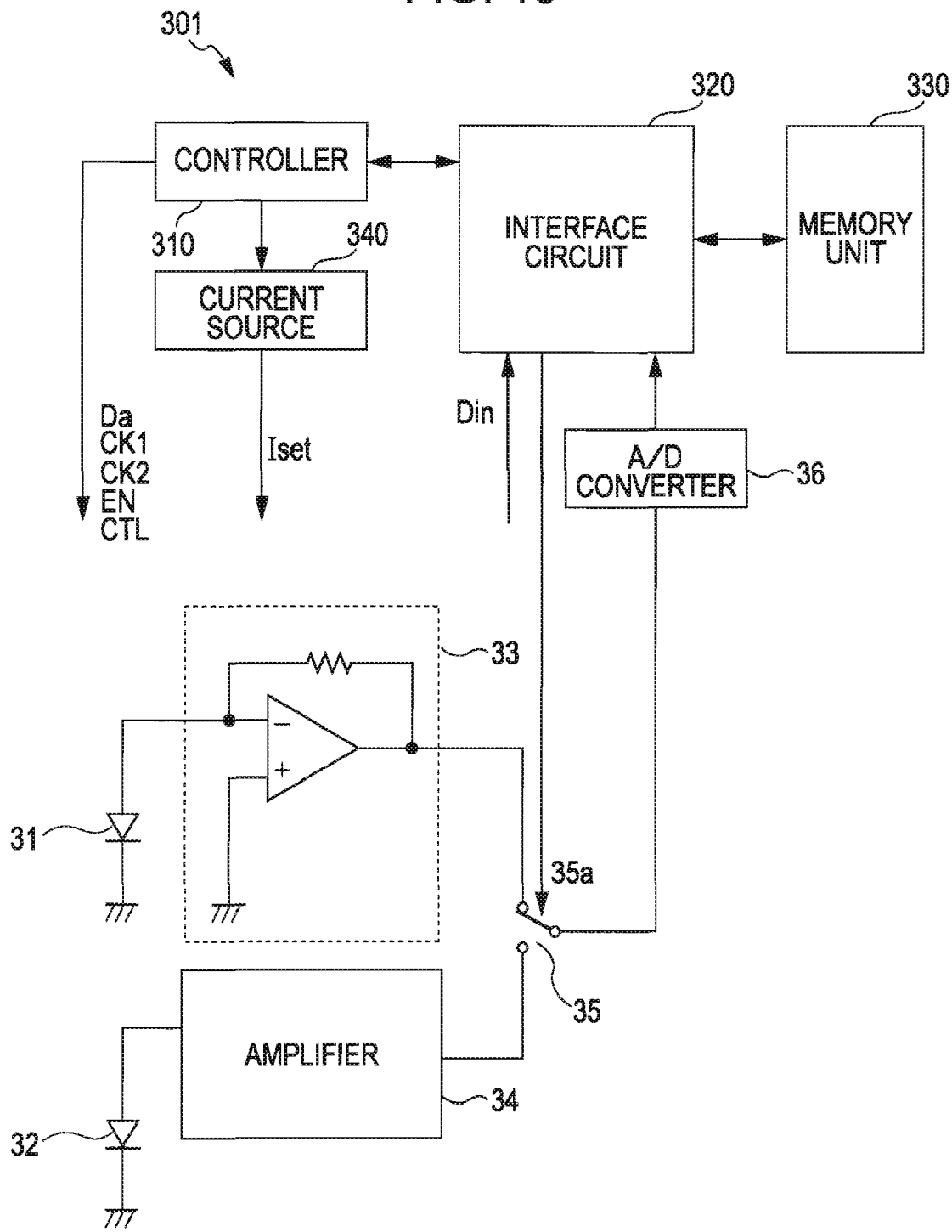
FIG. 15 is a block diagram showing a control circuit used in the same device as above.

FIG. 15 shows a detailed structure of the control circuit 301. Referring to FIG. 15, the control circuit 301 includes amplifiers 33 and 34. The amplifier 33 includes an operational amplifier and a resistor, and converts current that is output from the optical sensor 31 into voltage to be output. The amplifier 34 has the same structure as the amplifier 33. A switch 35 selects any one of output signals 33a and 34a in response to a control signal 35a, and supplies the selected signal to an A/D converter 36. The A/D converter 36 converts the output signals 33a and 34a into a digital signal, so as to be supplied to the interface circuit 320 as light quantity data D1 and D2.

When in the measuring mode, the controller 310 measures light emission intensity (luminosity) of any one of the OLED elements 10 by adding the light quantity data D1 and D2 obtained by the interface circuit 320. The reason why the optical sensors 31 and 32 are disposed at both ends of the light emission area AA is that the light emission intensity of the OLED elements 10 can be accurately measured regardless of the locations of the OLED elements 10 by commutating the sum of the light quantity measured by the optical sensors 31 and 32.

In the aforementioned first embodiment, as described with reference to FIG. 8, when in the measuring mode, the light measurement system 20 determines whether the light emission intensity is in the specific range in step S6. However, in the present embodiment, this is performed by the controller 310. Thus, current data can be generated to be input to the memory unit 330 without having to use the light measurement system 20. In this case, the controller 310 performs a process of sequentially selecting an OLED element 10 to be measured from among the plurality of OLED elements 10, a process of generating the designated data Da that allows the selected OLED element 10 to emit light, a process of generating current data so that the light emission intensity of the selected OLED element 10 is in the specific range based on the light quantity data D1 and D2, and a process of inputting the generated current data to the memory unit 330. In other words, all of the processes of FIG. 8 are performed by the controller 310.

The light emitting device 2 may update the current data stored in the memory unit 330 by receiving an update command from the main body of the image forming apparatus. In this case, in the main body of the image forming apparatus, a usage frequency is managed for each of the plurality of OLED elements 10. When the usage frequency reaches a predetermined usage frequency, specific data that specifies the OLED element 10 of which a usage frequency reaches the predetermined frequency is generated and the update command including the specific data is supplied to the light emitting device 2.

Figure 16:
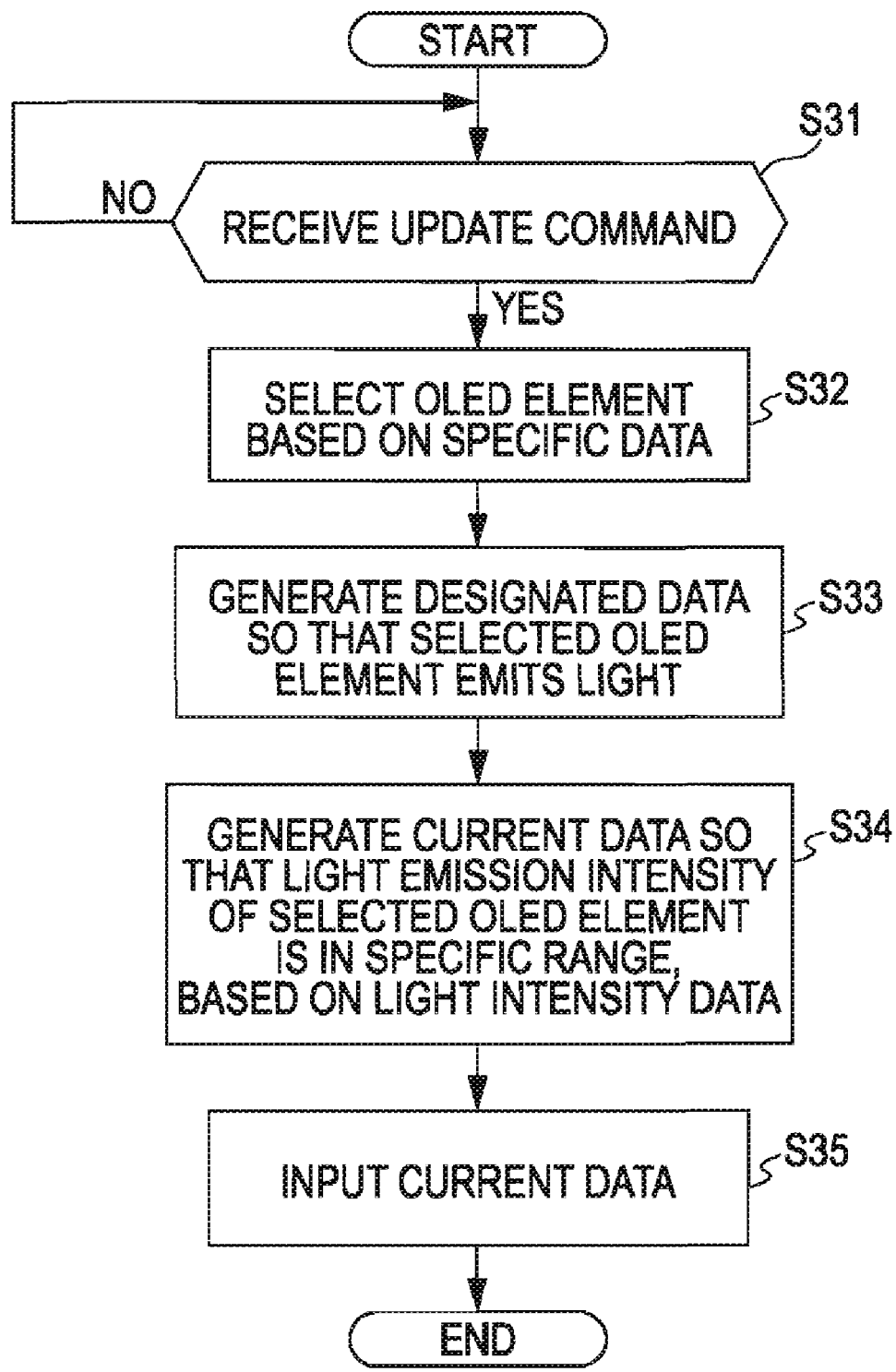
FIG. 16 is a flowchart showing an operation of updating current data of the same device as above.

FIG. 16 is a flowchart showing an operation of updating current data of the controller 310. The controller 310 determines whether the update command is received or not (step S31). If the update command is received the OLED device 10 of which the usage frequency reaches the predetermined usage frequency is selected based on specific data (step S32). Thereafter, the controller 310 generates the designate data Da that allows the selected OLED element 10 to emit light (step S33). Further, current data is regulated in the same manner as in steps S2 to S7 of the measuring mode. Specifically, according to the light quantity data D1 and D2, the current data is generated so that the light emission intensity of the selected OLED elements 10 is in the specific range (step S34). Thereafter, the controller 310 inputs the generated current data to the memory unit 330 (step S35). Thus, even if a light emission characteristic of each OLED element 10 changes in use, the light emission intensity can be uniformly obtained. The current data is updated while printing is not carried out.

The light emitting device 2 including the optical sensors 31 and 32 can correct a temperature characteristic (a relationship between temperature and light emission brightness). Since the light emission characteristic of the OLED elements 10 changes according to temperature, each of the OLED elements 10 may have different temperature when power is supplied and when a time elapses thereafter. Hence, the set signal, may be updated when in the measuring mode while printing is not carried out. Since the correction is performed in a short time period, it is preferable not to change the current data stored in the memory unit 310.

Third Embodiment

Hereinafter, an embodiment of a light emitting device suitable for correcting a temperature characteristic (relationship between temperature and light emission brightness) will be described.

Figure 17:
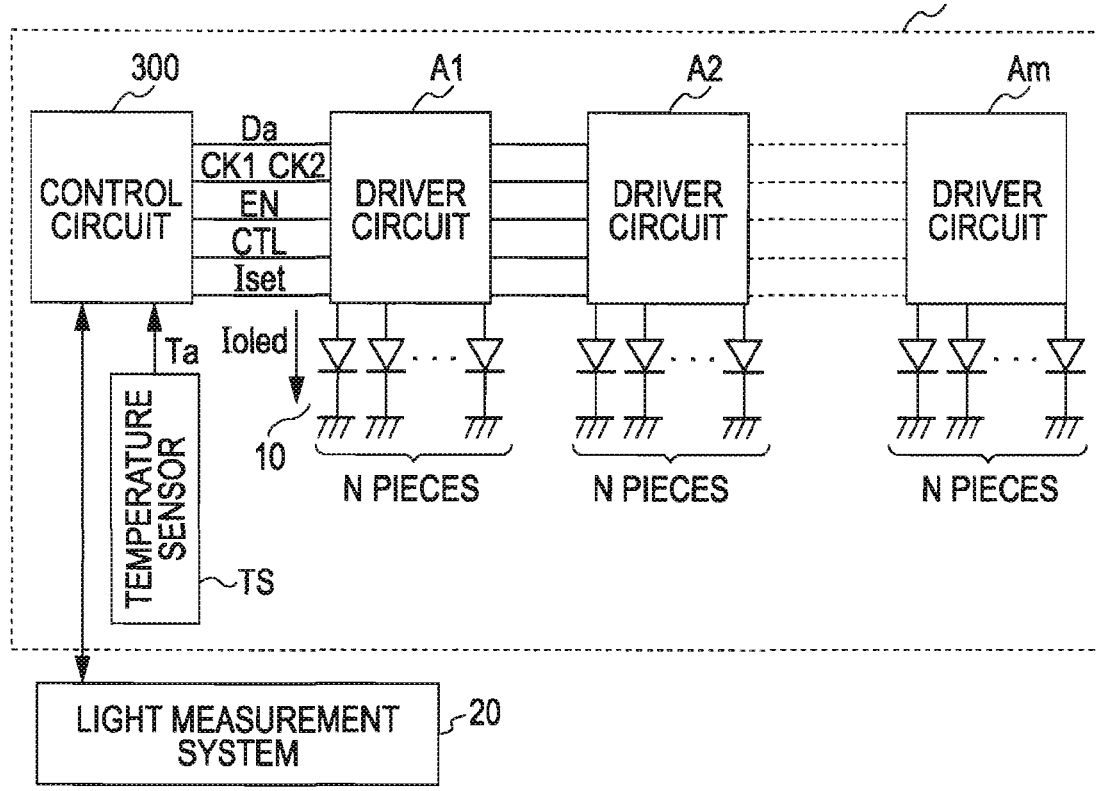
FIG. 17 is a block diagram showing a structure of a light emitting device and a peripheral structure thereof according to a third embodiment of the invention.

FIG. 17 is a block diagram of a structure of a light emitting device 3 and a peripheral structure thereof. Referring to FIG.

17, the light emitting device 3 includes m driver circuits A1 to Am, the control circuit 300 controlling the driver circuits A1 to Am, and a temperature sensor (a temperature measurement unit) TS. The temperature sensor TS is closely disposed to the OLED elements 10, and supplies a temperature signal Ta indicating temperature to the control circuit 300. The driver circuits A1 to Am and the control circuit 300 are the same as those in the first embodiment. Thus, each of the driver circuits A1 to Am has the structure of FIG. 3, and each processing unit U1 to Un of the driver circuits A1 to Am has the latch/decode circuit 220, and the aforementioned current control circuit 230 of FIG. 6. However, the control circuit 300 compensates for temperature based on the temperature signal Ta, and generates the set current Iset at the present temperature.

The control circuit 300 includes a non-volatile memory (to be described below). The current data, which determines the magnitude of the driving current Ioled of each of the OLED elements 10, is stored therein at a reference temperature (a predetermined temperature).

Figure 18:
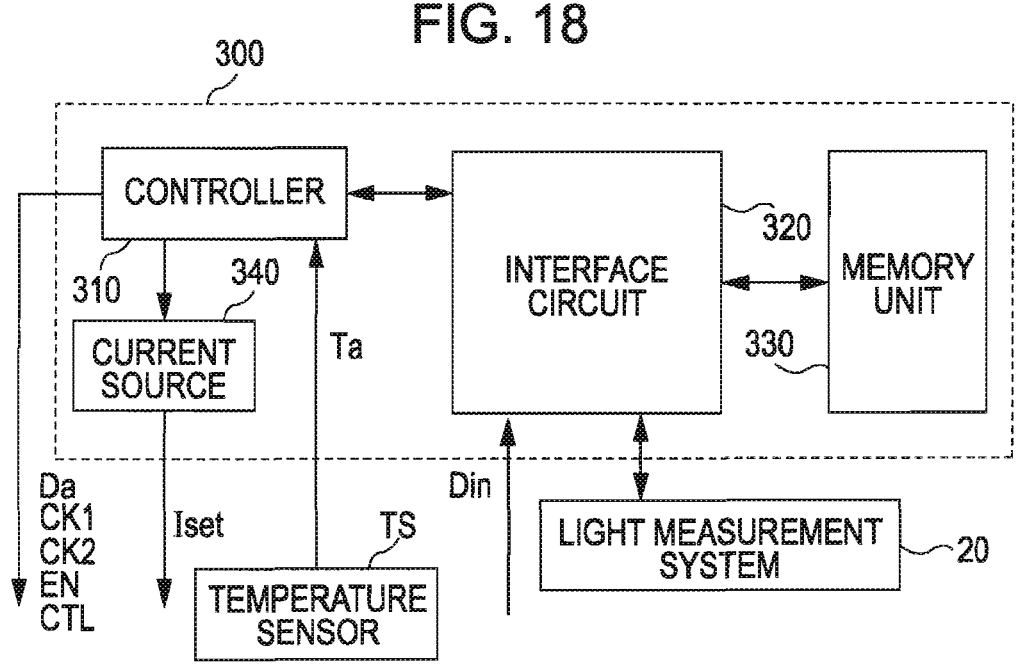
FIG. 18 is a block diagram of a control circuit 300 used in the same device as above.

FIG. 18 is a detailed block diagram of the control circuit 300 according to the present embodiment of the invention. The control circuit 300 is the same as the aforementioned control circuit (FIG. 7) according to the first embodiment of the invention. However, in the controller 310 of the present embodiment, the temperature signal Ta is supplied from the temperature sensor TS (FIG. 7). The writable non-volatile memory 330 stores the current data that indicates the magnitude of the driving current Ioled to be supplied to each of the OLED elements 10 at the reference temperature (the predetermined temperature). The current data indicates the magnitude of the driving current Ioled at the reference temperature when the light emission intensity of each of the OLED elements 10, is in the specific range when in the measuring mode. Further, the current data is input when in the measuring mode, and is read at a specific updating timing of the initial mode or the normal operation mode.

When the read current data is supplied to the controller 310, the controller 310 sends a command for designating the magnitude of the set current Iset to the current source 340. The current source 340 changes the magnitude of the set current Iset according to the command received from the controller 310, and outputs the result to each of the processing units U1 to Un. However, the OLED elements 10 have a characteristic in which light emission efficiency varies depending on temperature. Therefore, even when current of the same magnitude is supplied, if temperature changes, the light emission intensity (luminosity) of the OLED elements 10 varies. Meanwhile, the current data stored in the memory unit 330 is measured at a specific temperature when in the measuring mode. Thus, if the present temperature deviates from the specific temperature, the OLED element 10 is not allowed to emit light with an accurate light quantity. Hence, the controller 310 performs an operation process for the current data read from the memory unit 330 according to a difference between the present temperature indicated by the temperature signal Ta and the specific temperature, so as to determine the magnitude of the set current Iset. In the operation process, the operation is carried out so that the light emission intensity of the OLED elements 10 depending on a temperature variation can be compensated for. In general, a printer has a warm-up period. However, even after the period elapses, temperature of an optical head, that is, the light emitting device 3, changes. Therefore, in the present embodiment, the set current Iset is updated by performing the operation process at a specific timing of the normal operation mode.

When in the normal operation mode, if the image data Din is supplied from a printer main body, the image data Din is supplied to the controller 310 via the interface circuit 320. The controller 310 generates the designated data Da composed of the gradation data Db and the location data Dc based on the image data Din, so as to be supplied to each of the driver circuits A1 to Am. Further, the controller 310 generates the fist clock signal CK1, the second clock signal CK2, the enable signal EN, and the set control signal CTL, and outputs these control signals to the driver circuits A1 to Am.

Operations of the light emitting device 3 and the light measurement system 20 according to the present embodiment when in the measuring mode are the same as described in the flowchart of FIG. 8 according to the first embodiment. However, in the measuring mode of the present embodiment, the temperature of the OLED element 10 is maintained at a specific temperature by the use of an external temperature controller (not shown). In this case, it is preferable that the specific temperature is set to be a stable temperature that is determined when a predetermined time elapses in the normal operation mode. Accordingly, errors of the operation process can be reduced.

When in the measuring mode, the controller 310 inputs the current data, which indicates the magnitude of the set current Iset of which light emission intensity is in the specific range for all of the OLED elements 10, to the memory unit 330 via the interface circuit 320. Through the measuring mode, the current data, which has undergone a process of correcting variation of a light emission characteristic of each of the OLED elements 10 at a specific temperature, is stored in the non-volatile memory 330. The measurement is performed in a factory where the light emitting device 3 is manufactured.

Figure 19:
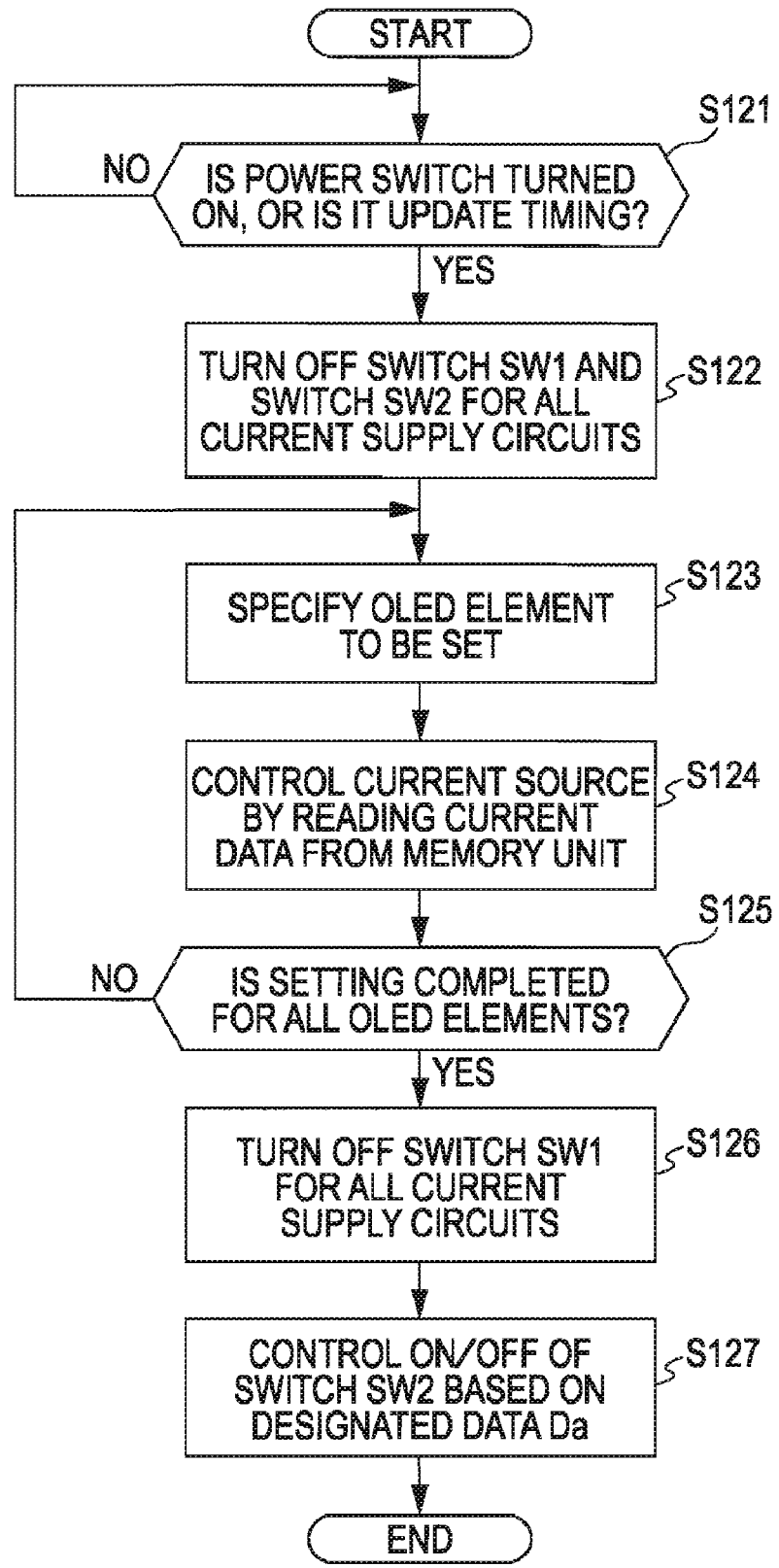
FIG. 19 is a flowchart showing an operation of the same device as above when in an initial mode and a normal operation mode.

FIG. 19 is a flowchart showing an operation of the light emission device 3 when in the initial mode and the normal operation mode. First, the controller 310 determines whether the power switch of the image forming apparatus is in the on-state, or whether it is in update timing or not (step S121). When the power switch is in the off-state, the magnitude of the driving current Ioled is not stored in the current supply circuit 230. Therefore, the set current Iset has to be supplied to each of the current supply circuits 230 when in the initial mode immediately after the power switch is turned on, so that the magnitude of the driving current Ioled can be maintained. When in the initial mode, the magnitude of the driving current Ioled is initially determined by each of the current supply circuits 230. Since temperature changes at a later time after power is supplied, the magnitude of the driving current Ioled has to be updated during the normal operation mode according to temperature variation. An updating timing is defined as a timing at which the set current Iset is supplied to each of the current supply circuits 230 during the normal operation mode, so as to re-determine the magnitude of the driving circuit Ioled. The update timing is determined in an appropriate manner. Specifically, the updating timing is determined by the following aspects.

According to a first aspect, the set current Iset is updated at a predetermined time period. In this case, an update timing signal indicating the updating timing is generated by means of a timer (a timer unit) that measures one period of time, and as a result, the set current Iset is updated.

According to a second aspect, the update timing is defined as a time point when temperature is changed by a predetermined value or more. In this case, the magnitude of the temperature signal Ta at a time for supplying the set current Iset is previously stored in a register as a set temperature, and a difference between the set temperature and the present temperature indicated by the temperature signal Ta is estimated. Then, the difference is compared with a reference value. In addition, a time point when the deference exceeds the reference value is defined as the update timing. Here, the reference value is preferably set such that changes in the light emission brightness of the OLED elements 10 can be detected by the human eye.

The update timing may be set by properly combining the first and second aspects. Further, the update timing is preferably performed during an idle time period of the light emitting device 3. The image forming apparatus forms an image on the photosensitive drum 110 when a printing command is received from an external device or the like. If the set current Iset is updated during printing, the printed image has different density on some portions of a sheet of paper. Therefore, the set current Iset is preferably set during the idle time period of the light emitting device 3 in the absence of the printing command. Further, if the printing command is received while the set current Iset is updated, the printing is in a standby mode until the updating is completed. The printing is performed after the updating is completed.

Next, the controller 310 generates the set control signal CTL so that the switch SW1 is tuned off for all of the current supply circuits 230, while the designated data Da is set so that the switch SW2 is turned off for all of the current supply circuits 230 (step S122).

Next, the controller 310 specifies the OLED element 10 to be set, and generates designated data Da so that only the switch SW2 corresponding to the OLED element 10 is turned on while generating the set control signal CTL so that only the switch SW1 corresponding to the OLED element 10 is turned on (step S123). For example, the OLED element 10 disposed in the far left may be specified. Thereafter, the controller 310 reads current data corresponding to the OLED element 10 from the memory unit 330, determines the magnitude of the set current Iset by performing the operation process for the current data in order to perform the aforementioned temperature compensation, and controls the current source 340 so that the set current Iset has that magnitude (step S124). Accordingly, the current supply circuit 230 inputs the driving current Ioled having the magnitude suitable for the present temperature to the holding unit of the current supply circuit 230, for the OLED element 10. In other words, the setting of the driving current Ioled which is suitable for the present temperature and has to be supplied to the OLED element 10 is completed.

Next the controller 310 determines whether the setting is completed for all of the OLED elements 10 (step S125), and steps S123 to S125 are repeated until it is completed. When the process of inputting the magnitude of the driving current Ioled to the holding unit of the current supply circuit 230 is completed for all of the OLED elements 10, the initial mode is ended, and the normal operation mode begins.

When in the normal operation mode, the controller 310 inactivates the set control signal CTL to be supplied to all of the current supply circuit 230, so that all of the switches SW1 are turned off (step S126). Next, the controller 310 generates and outputs the designated data Da based on the image data Din (step S127). Accordingly, the on/off of each switch SW2 is controlled, and the driving current Ioled having an individually determined magnitude flows to the designated data Da for a predetermined time period. In step S127 of the normal operation mode, it is determined whether the update timing is equivalent to that in step S121.

As described above, in the present embodiment, in addition to the effect of the first embodiment, changes in the light emission brightness of the OLED element 10 caused by temperature variation is compensated for by changing the magnitude of the driving current Ioled. Therefore, even if ambient temperature changes, printing can be carried out to obtain an image with a uniform density.

Although the current data is stored in the memory unit 330 at the specific temperature in the aforementioned third embodiment, the memory unit 333 may store the temperature data obtained by measuring the specific temperature by the use of the temperature sensor TS when the current data is generated. Further, the controller 310 sets the set current Iset by performing the operation process according to a difference between the specific temperature read from the storage unit 330 and the present temperature indicated by the temperature signal Ta. Accordingly, if the temperature at which the current data to be stored in the memory unit 330 is generated is measured by the use of the temperature sensor TS measuring the present temperature, temperature measurement errors can be reduced. In addition, if the specific temperature is stored in the memory unit 330 as the temperature data, the ambient temperature is not necessarily controlled in a good precision when the current data is generated.

Fourth Embodiment

Next, a light emitting device according to a fourth embodiment of the invention will be described. The light emitting device has the same structure as the light emitting device in the third embodiment except for a data structure of the memory unit 330 and the detailed operation of the controller 310.

Figure 20:
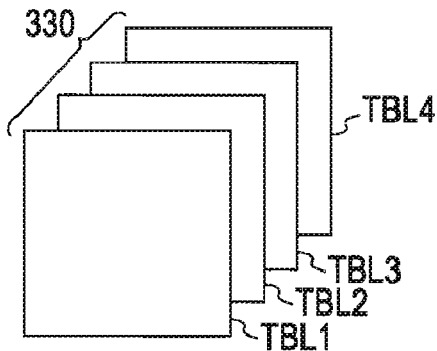
FIG. 20 shows a memory unit's data structure of a light emitting device according to a fourth embodiment of the invention.

FIG. 20 shows a data structure of the memory unit 330 according to the fourth embodiment of the invention. In the aforementioned third embodiment, the memory unit 330 stores the current data at the specific temperature (the reference temperature). In the fourth embodiment, the memory unit 330 stores the current data at a plurality of reference temperatures, respectively. In this case, the memory unit 330 includes data tables corresponding to the plurality of reference temperatures, respectively. Referring to FIG. 20, the memory unit 330 is composed of first to fourth data tables TBL1 to TBL4. The first data table stores current data measured at a first reference temperature t1. The second data table stores current data measured at a second reference temperature t2. The third data table stores current data measured at a third reference temperature t3. The fourth data table stores current data measured at a fourth reference temperature t4.

As the operation process of generating the set signal Iset (step S124 of FIG. 19), the controller 310 generates the set signal Iset by interpolating the current data at the plurality of reference temperatures t1 to t4 read from the memory unit 330 according to a difference between the present temperature indicated by the temperature signal Ta supplied from the temperature sensor Ts and the plurality of reference temperatures t1 to t4. For example, if it is assumed that the present temperature is t12 (t1<t12<t2), and the current data value at the reference temperature t1 is X1, the current data value at the reference temperature t2 is X2, and the current data value at the present temperature t12 is X12, then X12 is defined as the following equation.

$$X12=\{X1(t2-t12)+X2(t12-t1)\}/(t2-t1)$$

Here, t2−t12 and t12−t1 denote a difference between the present temperature and the reference temperature. This operation may be a process of interpolating the current data at the reference temperature based on the difference.

Accordingly, by generating the set current Iset through interpolation, the light emission brightness of each of the OLED elements 10 can be further accurately controlled. In addition, similarly to the third embodiment, in the fourth embodiment, the temperature data obtained by measuring the reference temperature (the specific temperature) by the use of the temperature sensor TS when the current data is generated may be stored in the memory unit 330. In this case, the controller 310 performs an interpolation process according to the difference between the present temperature indicated by the temperature data read from the memory unit 330 and the present temperature indicated by the temperature signal Ta, and sets the set current Iset. Accordingly, if the temperature, at which the current data to be stored in the memory unit 330 is generated, is measured by the use of the temperature sensor TS measuring the present temperature, temperature measurement errors can be reduced. In addition, if the specific temperature is stored in the memory unit 330 as the temperature data, the ambient temperature is not necessarily controlled in a good precision when the current data is generated.

Fifth Embodiment

Next, a light emitting device according to a fifth embodiment of the invention will be described. The light emitting device does not require the temperature sensor TS. Further, the light emitting device has the same structure as the light emitting device in the third embodiment except for the detailed structure of the current source 340 and the detailed operation of the controller 310. In the aforementioned third and fourth embodiments, the set current Iset is generated at the present temperature by performing the temperature compensation in the operation process. However, in the fifth embodiment, the current source 340 (see FIGS. 6 and 18) of the control circuit 300 employs a temperature compensation circuit having a temperature characteristic, and thus a temperature compensated set current Isetc is generated.

Figure 21:
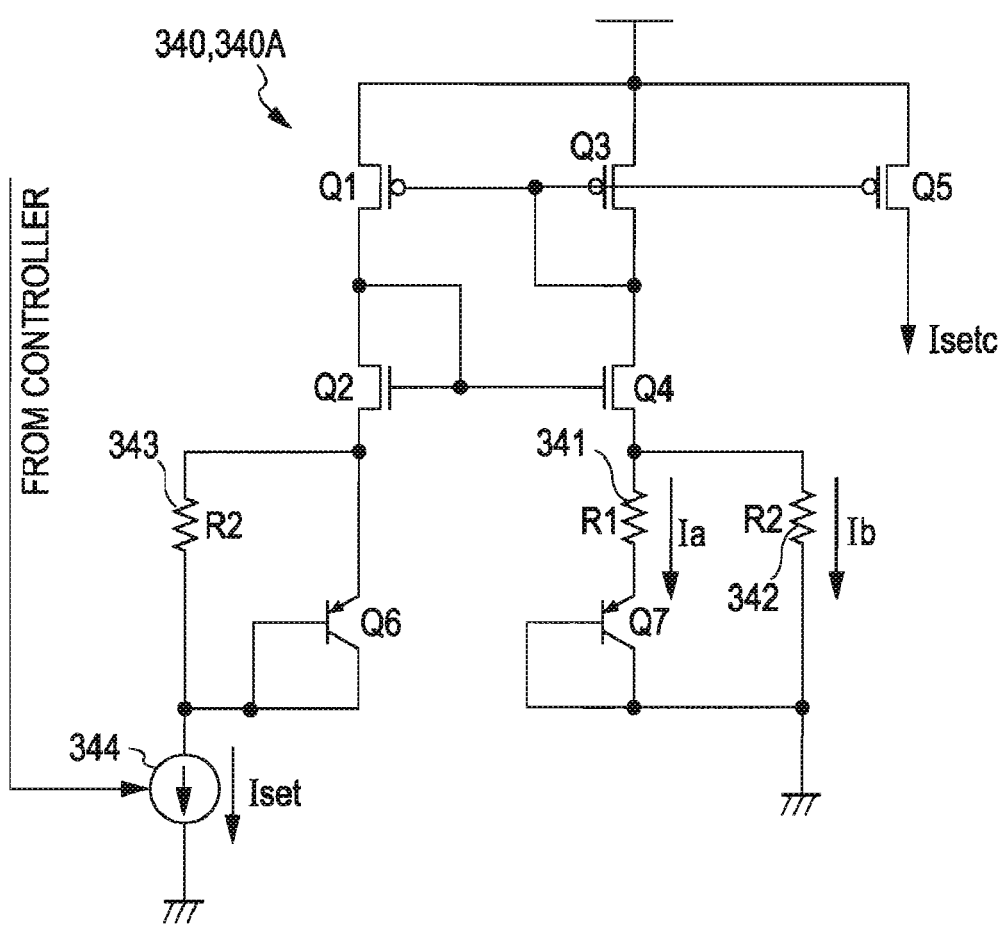
FIG. 21 is a circuit diagram showing a structure of a current source of a light emitting device according to a fifth embodiment of the invention.

FIG. 21 shows a detailed structure of the current source 340 according to the fifth embodiment of the invention. Referring to FIG. 21, the current source 340 includes a temperature compensation circuit 340A. The temperature compensation circuit 340A includes transistors Q1 to Q7, resistors 341 to 343, and a variable current source 344. The resistance of the resistor 341 is R1, and the resistances of the resistor 342 and 343 are R2. In the above structure, the transistors Q1 to Q4 constitute a current mirror circuit, and electrical potentials of sources of the transistors Q2 and Q4 are maintained to be constant. The base width of the transistor Q6 and the base width of the transistor Q7 are set to be related as 1:K.

In this case, the set current Iset flowing to the resistor 343 and the transistor Q6 is controlled by the variable current source 344 so as to have a magnitude depending on the current data read from the memory unit 330. In other words, the controller 310 (see FIG. 18) sequentially reads the current data from the memory unit 330, and provides a signal for controlling the variable current source 344 so that the set current Iset having a magnitude indicated by the current data is supplied to the variable current source 344.

The transistor Q7 is equivalent to a diode because its base and collector are connected. An equivalent resistance R4 of the diode has a negative temperature coefficient. In other words, if temperature increases, the equivalent resistance R4 decreases.

If it is assumed that an eclectic potential difference between both ends of a set of the resistor 341 and the transistor A7 is Vr1, and an eclectic potential difference between both ends of the resistor 342 is Vr2, then a current Ia flowing through the set of the resistor 341 and the transistor Q7 and a current Ib flowing through the resistor 342 are related as the following equation.

$$Ia = Vr1/(R1+R4)$$

$$Ib = Vr2/R2$$

In addition, the temperature compensated set current Isetc is related as setc=Ia+Ib.

Since the resistance R4 of the diode equivalent to the transistor Q7 has the negative temperature coefficient, a temperature coefficient of the resistance R1+R4 of the set of the resistor 341 and the transistor Q7 differs from that of the resistance R2 of the resistor 342. Therefore, if a ratio of R1 and R2 is appropriately chosen, the temperature compensated set current Isetc can have a desired temperature coefficient. In this embodiment, the ratio of R1 and R2 and a coefficient K are set such that the temperature characteristic (relationship between temperature and light emission brightness) of the OLED elements 10 is compensated for so as to be counterbalanced.

Operations of the light emitting device 3 and the light measurement system 20 according to the present embodiment when in the measuring mode are the same as described in the flowchart of FIG. 8 according to the first embodiment. Similarly to the third embodiment, when in the measuring mode, the temperature of the OLED elements 10 is maintained to be a specific temperature by the external temperature controller (not shown). The operations of the light emitting device 3 when in the initial mode and the normal mode are the same as the description of the third embodiment except for step S124. In the present embodiment, in step S124, the controller 310 reads current data corresponding to the OLED element from the memory unit 330, and controls the variable current source 344 so that the set current Iset having the magnitude indicated by the current data flows to the resistor 343 and the transistor Q6. The temperature compensation circuit 340A generates the compensated set signal Isetc by performing temperature compensation for the set current Iset. According to the aforementioned principle described with reference to FIG. 6, the driving current Ioled, which is suitable for the present temperature and has the same magnitude as the compensated set signal Isetc of the current source 340, flows to the OLED element 10, so that the magnitude of the driving current Ioled suitable for the present temperature is input to the holding unit of the current supply circuit 230. In other words, the setting of the drilling current Ioled, which is suitable for the present temperature and has to flow to the OLED element 10, is completed.

As described above, in the fifth embodiment, the variable current source 344 is controlled by sequentially reading the current data from the memory unit 330, thereby generating a current having a magnitude indicated by the current data. Then, the current source 340 performs temperature compensation for this current, and generates the compensated set signal Iset. In other words, since the temperature compensation is performed in a hardware manner, a processing load of the controller 310 can be reduced, and the temperature sensor TS can be omitted.

Modified Embodiment (1) Although the light emitting device using the OLED elements 10 has been exemplified in the aforementioned embodiments, the invention is not limited thereto. For example, any light emitting element that emits light by receiving the driving signal may be used. The light emitting element may be an inorganic EL element. Further, an LED (Light Emitting Diode) may be used as a light emitting layer. That is, in the invention, a light emitting material, which emits light when electric energy is supplied, is adequate for the light emitting element.

(2) Although the image forming apparatus has been described as an example in the aforementioned embodiments, the invention is not limited thereto. For example, the aforementioned light emitting device may be used in a display device in which the plurality of OLED elements 10 are arranged in a matrix form.

(3) In the second embodiment, when the current data is updated according to usage frequencies of the OLED elements 10, light emission intensity of an OLED element 10 to be updated is measured by the optical sensors 31 and 32. However, the invention is not limited thereto. For example, the light emitting device 2 may update the current data stored in the memory unit 330 by receiving a update command from the main body of the image forming apparatus. In this case, in the main body of the image forming apparatus, a usage frequency is managed for each of the plurality of OLED elements 10, and when the usage frequency reaches a predetermined usage frequency, specific data that specifies the OLED element 10 of which a usage frequency reaches the predetermined usage frequency is generated. Then, the update command including the specific data is supplied to the light emitting device 2.

Figure 22:
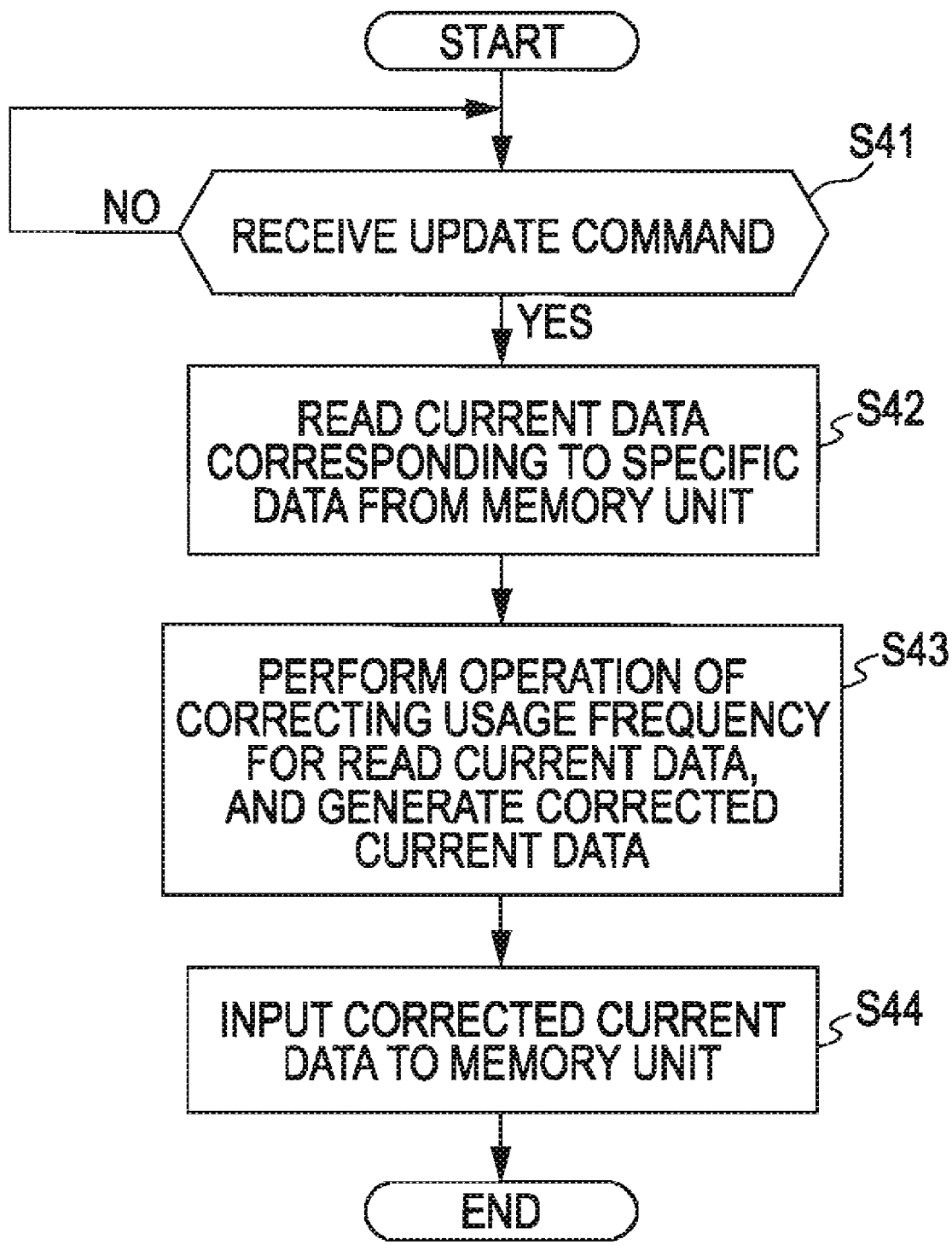
FIG. 22 is a flowchart showing an operation of updating current data of a light emitting device according to a modified embodiment of the invention.

FIG. 22 is a flowchart showing an operation of updating current data of the controller 310 according to a modified embodiment of the invention. The controller 310 (a read unit) determines whether the update command is received or not (step S41). If the update command is received, the OLED element 10 of which a usage frequency reaches the predetermined usage frequency is specified based on the specific data, and the current data corresponding to the OLED element 10 is read from the memory unit 330 (step S42). Next, the controller 310 (an operation unit) performs an operation of correcting the usage frequency for the read current data, and generates the corrected current data (step S43). For example, the operation may be defined such that the magnitude of the driving signal of the OLED element is 110% when a usage time of the OLED element reaches 500 hours, and the magnitude of the driving signal is 120% when the usage time reaches 1000 hours. Thereafter, the controller 310 (an input unit) inputs the generated current data to the memory unit 330 (step S44). Accordingly, the light emission intensity can be uniformly obtained without having to use the optical sensors 31 and 32 even if the light emission characteristic of the OLED elements 10 changes. In addition, the current data is updated when printing is not performed.

(4) Although the current supply circuit 230 is constructed to be a current programming type circuit, and supplies the current signal as the set signal Iset in the aforementioned embodiments, the invention is not limited thereto. Thus, the current supply circuit 230 may be constructed to be a voltage programming type circuit. In this case, the set signal is generated in the form of a voltage signal, to be supplied to the current supply circuit 230.

(5) The third and fourth embodiments may employ the measuring of the light emission intensity of the OLED elements by replacing the optical sensors 31 and 32 of the second embodiment with the light measurement system 20.

(6) The disposition of the driver circuits A1 to Am and the control signal 300 of FIGS. 10 to 12 may be used not only in the first embodiment but also in other embodiments.

Image Forming Apparatus

As shown in FIG. 1, the light emitting device according to the aforementioned embodiments may be used as a line type optical head for inputting a latent image onto an image carrier in an image forming apparatus using an electrophotographic method. Examples of the image forming apparatus include a printer, a printing unit of a copy machine, and a printing unit of a facsimile.

Figure 23:
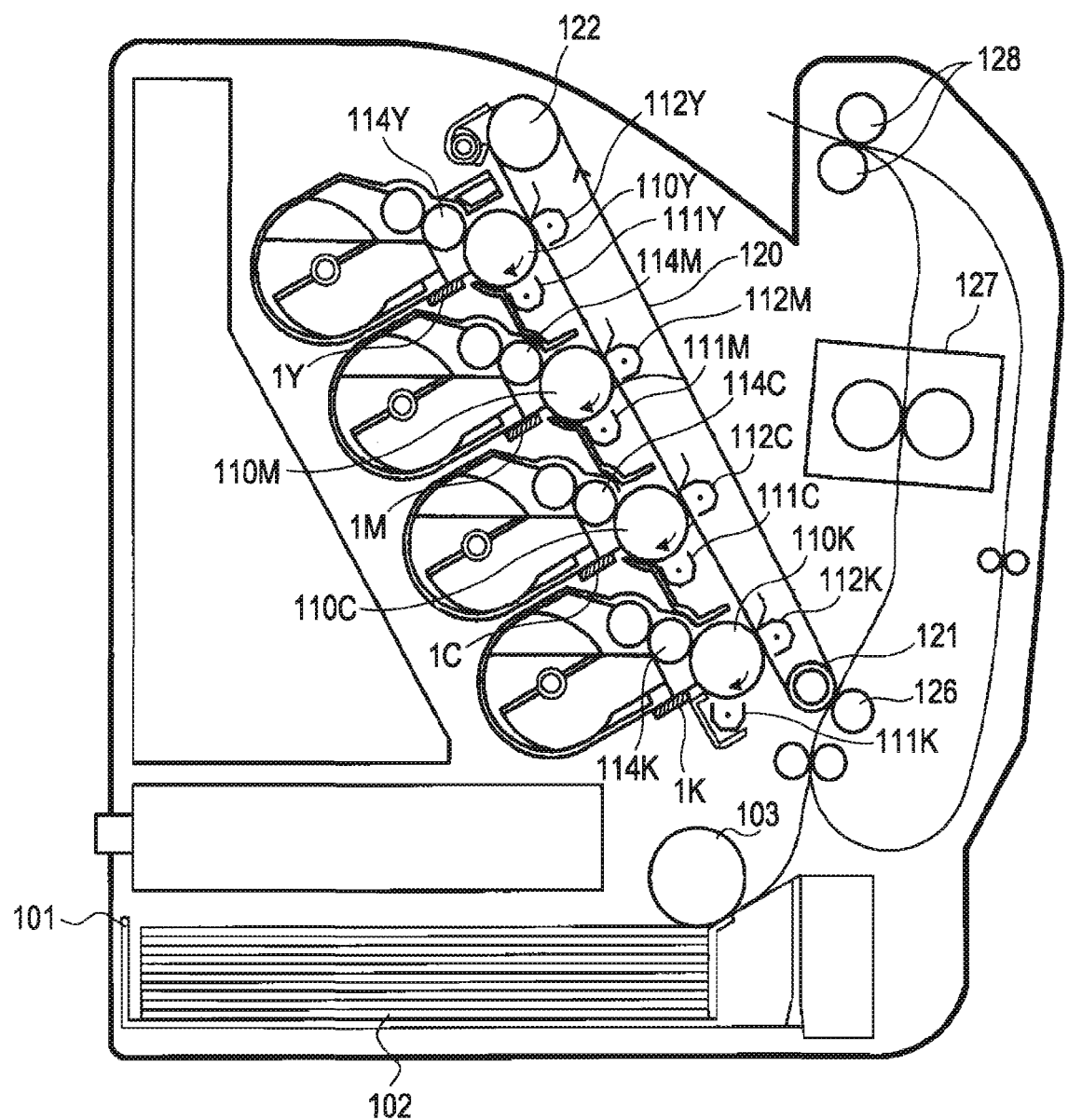
FIG. 23 is a vertical cross-sectional view showing a structure of an image forming apparatus using a light emitting device of the invention.

FIG. 23 is a vertical cross-sectional view showing an example of an image forming apparatus using the light emitting device 1, 2, of 3 as a line type optical head. The image forming apparatus is a tandem type full color image forming apparatus using a belt intermediate transfer medium method.

In the image forming apparatus, four organic EL array light exposing heads 1K, 1C, 1M, and 1Y having the same structure are respectively disposed at light exposing positions of four photosensitive drums (image carriers) 110K, 110C, 110M, and 110Y having the same structure. The organic EL array light exposing heads 1K, 1C, 1M, and 1Y are any one of the light emitting devices according to the aforementioned embodiments.

Referring to FIG. 23, the image forming apparatus includes a driving roller 121 and a driven roller 122. An endless intermediate transfer belt 120 is wound around these rollers 121 and 122, so as to rotate around the roller 121 and 122 as indicated by arrow. Although not shown, a tension roller or the like that provides tension to the intermediate transfer belt 120 may be included in the image forming apparatus.

Around the intermediate transfer belt 120, the four photosensitive drums 110K, 110C, 110M, and 110Y having photoconductive layers on their outer circumferential surfaces are disposed to be spaced apart from one another by a predetermined gap. The suffix K, C, M, and Y are respectively used to represent black, cyan, magenta, and yellow images. The same applies to other members. The photosensitive drums 110K, 110C, 110M, and 110Y rotate in synchronization with the driving of the intermediate transfer belt 120.

Around the photosensitive drums 110K, 110C, 110M, and 110Y are respectively disposed with corona chargers 111K, 111C, 111M, and 111Y, organic EL array light exposing heads 10K, 10C, 10M, and 10Y, and developers 114K, 114C, 114M, and 114Y. The corona chargers 111K, 111C, 111M, and 111Y equipotentially charge the outer circumferential surfaces of the corresponding photosensitive drums 110K, 110C, 110M, and 110Y. The organic EL array light exposing heads 1K, 1C, 1M, and 1Y input a latent image onto the charged outer circumferential surfaces of the photosensitive drums 110K, 110C, 110M, and 110Y. Each of the organic EL array light exposing heads 1K, 1C, 1M, and 1Y is disposed such that arrangement direction of the plurality of the OLED elements 10 follows a bus line (a main scanning direction) of the photosensitive drums 110K, 110C, 110M, and 110Y. The input of the latent image is carried out by irradiating light onto the photosensitive drum 110K, 110C, 110M, and 110Y by the plurality of light emitting elements 30. The developers 114K, 114C, 114M, and 114Y attach toner as a developing material onto the latent image, so that images, that is, visible images, are formed on the photosensitive drums 110K, 110C, 110M, and 110C.

The black, cyan, magenta, and yellow images, which are respectively formed in a process of forming each monochrome image of four colors, are firstly transferred onto the intermediate transfer belt 120 in a sequential manner, and are superimposed onto the intermediate transfer belt 120, thereby obtaining a full color image. The inner side of the intermediate transfer belt 120 is disposed with four first transfer corotrons (transfer units) 112K, 112C, 112M, and 112Y. The first transfer corotrons 112K, 112C, 112M, and 112Y are respectively disposed near the photosensitive drums 110K, 110C, 110M, and 110Y, and transfer images onto the intermediate transfer belt 120 passing between the photosensitive drums 110K, 110C, 110M, and 110Y and the first transfer corotrons 112K, 112C, 112M, and 112Y by electrostatically absorbing the images from the photosensitive drums 110k, 110C, 110M, and 110Y.

A sheet 102 on which an image is finally formed is fed sheet by sheet from a paper feed cassette 101 by a pickup roller 103, and is conveyed to a nip between the intermediate transfer belt 120 in contact with the driving roller 121 and a second transfer roller 126. The full color image formed on the intermediate transfer belt 120 is secondly transferred onto one side of the sheet 102 by the second transfer roller 126 at the same time, and is fixed onto the sheet 102 by passing through a fixing roller pair 127, that is, a fixing unit. Thereafter, the sheet 102 is discharged by a paper discharge roller pair 128 into a paper discharge cassette disposed at the upper portion of the apparatus.

Now, an image forming apparatus according to another embodiment of the invention will be described.

Figure 24:
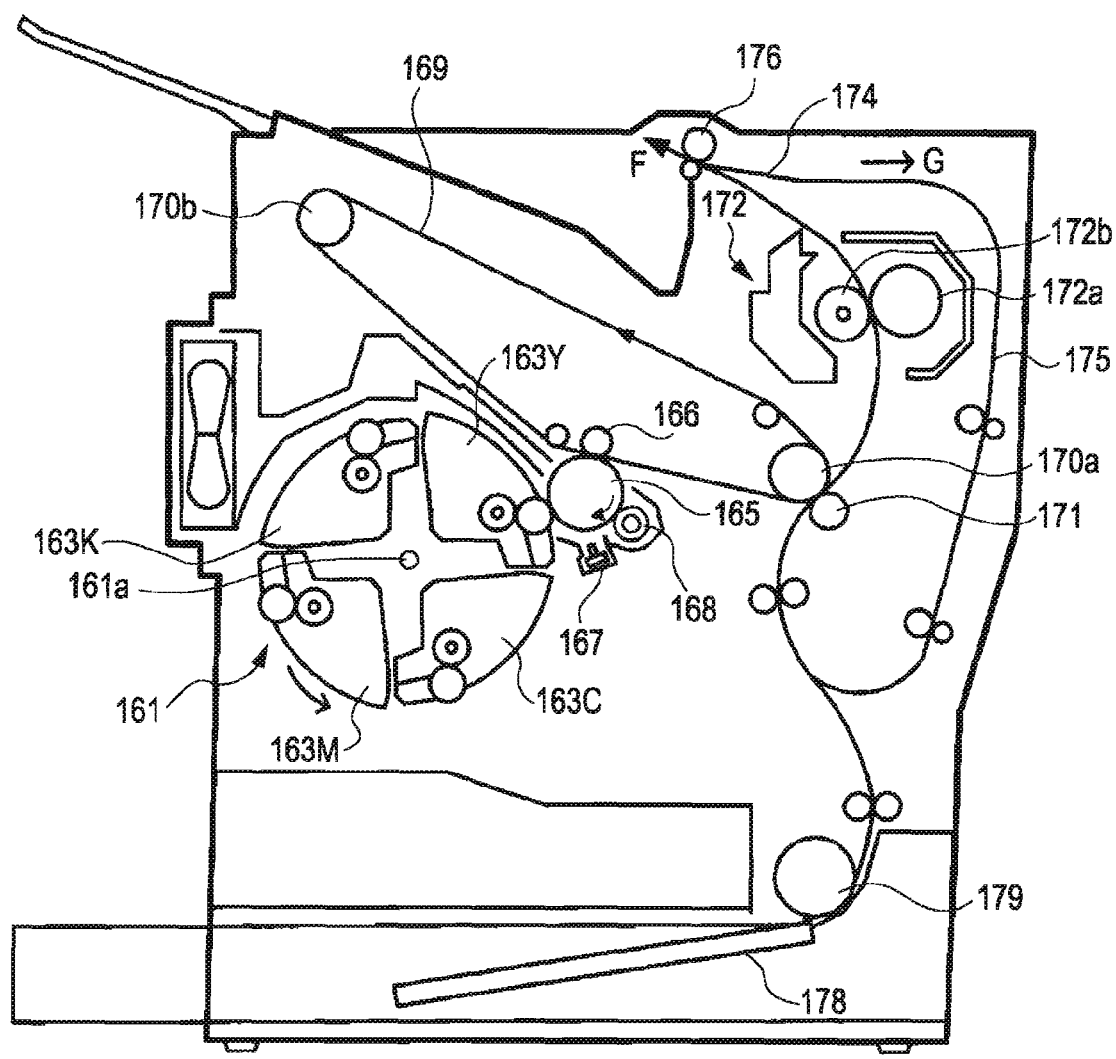
FIG. 24 is a vertical cross-sectional view showing a structure of another image forming apparatus using a light emitting device of the invention.

FIG. 24 is a vertical cross-sectional view of another image forming apparatus employing the light emitting device 1, 2, or 3 as a line type optical head. The image forming apparatus is a rotary development type full color image forming apparatus using a belt intermediate transfer medium method. In the image forming apparatus of FIG. 24, around a photosensitive drum 165 as disposed with a corona charger 168, a rotary type development unit 161, an organic EL array light exposing head 167, and an intermediate transfer belt 169.

The corona charge 168 equipotentially charges the outer circumferential surface of the photosensitive drum 165. The organic EL array light exposing head 167 inputs an latent image onto the charged outer circumferential surface of the photosensitive drum 165. The organic EL array light exposing head 167 is the light emitting device exemplified in each of the aforementioned embodiments, and is disposed such that an arrangement direction of the plurality of light emitting elements 30 follows a bus line (a main scanning direction) of the photosensitive drum 165. The input of the electrostatic latent image is carried out by irradiating light onto the photosensitive drum 165 from these light emitting elements 30.

The development unit 161 is a drum in which four developers 163Y, 163C, 163M, and 163K are disposed to be spaced apart by an angular distance of 90°, and is rotatable about an axis 161a in a counterclockwise direction. The developers 163Y, 163C, 163M, and 163K respectively supply yellow, cyan, magenta, and black toners onto the photosensitive drum 165, and attach the toners as a developing material onto the latent image, so that an image, that is, a visible image, are formed on the photosensitive drum 165.

The endless intermediate transfer belt 169 is wound around a driving roller 170a, a driven roller 170b, a first transfer roller 166, and a tension roller, and rotates around these rollers in a direction indicated by arrow. The first transfer roller 166 electrostatically absorbs the image from the photosensitive drum 165, so that the image is transferred onto the intermediate transfer belt 169 passing between the photosensitive drum 165 and the first transfer roller 166.

Specifically, when the photosensitive drum 165 initially makes one revolution, the latent image for an yellow Y image is input to the light exposing head 167 so that the yellow image is formed by the developer 163Y, and the image is then transferred onto the intermediate transfer belt 169. Next, when making one revolution secondly, a latent image for a cyan C image is input to the light exposing head 167 so that the cyan image is formed by the developer 163C, and the image is then transferred onto the intermediate transfer belt 169 so as to be superimposed onto the yellow image. While the photosensitive drum 165 makes four revolutions in this manner, the yellow, cyan, magenta, and block images are sequentially superimposed onto the intermediate transfer belt 169, thereby forming the full color image onto the intermediate transfer belt 169. In the case of double-side printing, a first color image is transferred onto the upper and lower surfaces of the intermediate transfer belt 160, and thereafter a second color image is transferred onto the upper and lower surfaces of the intermediate transfer belt 169, and so on. In this manner, a full color image is formed on the intermediate transfer belt 169.

In the image forming apparatus, a sheet conveying path 174 is formed to pass a sheet. The sheet is taken out sheet by sheet by the pickup roller 179 from the paper feed cassette 178, so as to move forwards the sheet conveying path 174 by a conveyance roller, and then passes through a nip between the intermediate transfer belt 169 in contact with the driving roller 170a and the second transfer roller 171. The second transfer roller 171 transfers an image onto one side of the sheet by electrostatically absorbing the full color image at the same time, from the intermediate transfer belt 169. The second transfer roller 171 is constructed to approach or be separated to/from the intermediate transfer belt 169 by a clutch (not shown). Moreover, when the full color image is transferred onto the sheet, the second transfer roller 171 is abutted to the intermediate transfer belt 169. Whereas, while the developing is repeated on the intermediate transfer belt 169, the intermediate transfer belt 169 is separated from the transfer roller 171.

The sheet on which an image is transferred in the above manner is conveyed to the fixing unit 172, and passes between a heat roller 172a and a pressure roller 172b of the fixing unit 172 thereby fixing the image onto the sheet. After the fixing process is completed, the sheet is drawn into a paper discharge roller pair 176 so as to move forwards in direction F. In the case of double-side printing, the paper discharge roller pair 176 reversely rotates after the sheet mostly passes the paper discharge roller pair 176, and comes into a duplex printing conveying path 175 as indicated by arrow G. Thereafter, the image is transferred onto the other side of the sheet by the second transfer roller 171, and the fixing process is again carried out by the fixing unit 172. Then, the sheet is discharged to the paper discharge roller pair 176.

Since the image forming apparatus of FIGS. 23 and 24 uses the OLED element 10 as a light exposing element, the apparatus can be more downsized than the case where a laser scanning optical system is used. In addition to the above exemplified image forming apparatus, an electrophotographic image forming apparatus also employs the light emitting device of the invention. For example, the light emitting device is also applicable to an image forming apparatus which directly transfers an image onto a sheet from the photosensitive drum instead of using the intermediate transfer belt, or to an image forming apparatus which forms a black and white image.

The image forming apparatus employing the light emitting device of the invention is not limited to the image forming apparatus. For example, the light emitting device of the invention may be used as an illumination device in a variety of electronic apparatuses. Examples of the electronic apparatuses include a facsimile, a copy machine, a multifunction printer, and a printer. These electronic apparatuses appropriately employ a light emitting device in which a plurality of light emitting elements are arranged in a surface form.

The entire disclosure of Japanese Patent Application Nos: 2005-257554, filed Sep. 6, 2005, 2006-133594, filed May 12, 2006 and 2005-281523, filed Sep. 28, 2005 are expressly incorporated by reference herein.

What is claimed is:

1. A light emitting device comprising:
a plurality of light emitting elements that emit light to have luminosity depending on the magnitude of a driving signal;
a plurality of holding units that are respectively disposed in the plurality of light emitting elements, and respectively hold the driving signal to maintain a certain magnitude to be supplied to a corresponding light emitting element;
a plurality of supply units that are respectively disposed in the plurality of light emitting elements, and supply the driving signal, which is held by the holding units for a period of time according to a gradation of light to be emitted, to the corresponding light emitting element;
a memory unit that respectively stores signal data indicating the magnitude of the driving signal, which is regulated so that luminosity of the plurality of light emitting elements becomes uniform for the plurality of light emitting elements;
a setting unit that sequentially reads the signal data from the memory unit, and generates a setting signal based on the signal data; and
an input circuit that sequentially supplies the driving signal having a magnitude depending on the magnitude of the setting signal to the holding units when the setting signal is supplied, and holds the driving signal.

2. The light emitting device according to claim 1, wherein the holding unit is a volatile memory, and the memory unit is a non-volatile memory.

3. The light emitting device according to claim 1, wherein the setting signal is a current signal or a voltage signal.

4. The light emitting device according to claim 1, comprising:
a designated data generator that generates designated data for designating a period of time for the light emitting elements to emit light based on image data; and
a plurality of light emitting controllers that are respectively disposed in the plurality of light emitting elements, and generate a light emission control signal which is valid for a period of time for the light emitting elements to emit light based on the designated data,
wherein the supply unit supplies the driving signal, which is held by the holding units for a period of time for the light emission control signal to be valid, to the corresponding light emitting element.

5. The light emitting device according to claim 4, comprising:
a measurement unit that respectively measures luminosity of the plurality of light emitting elements; and
a controller that performs a process of sequentially selecting the plurality of light emitting elements, a process of controlling the light emitting controller so that the designated data that allows the selected light emitting element to emit light, a process of generating signal data so that luminosity of the selected light emitting element is in a specific range, and a process of inputting the signal data to the memory unit.

6. The light emitting device according to claim 5, wherein:
the plurality of light emitting elements are arranged in a single line or in multiple lines;
the measurement unit includes at least two optical sensors disposed at both ends of the plurality of light emitting elements; and
the controller measures luminosity of the selected light emitting element according to the sum of output signals output from at least the two optical sensors.

7. The light emitting device according to claim 5, wherein, when usage frequencies of the plurality of light emitting elements respectively reach a predetermined usage frequency, the controller performs a process of receiving a specific data that specifies a light emitting element of which usage frequency reaches the predetermined usage frequency, a process of selecting the light emitting element of which usage frequency reaches the predetermined usage frequency based on the specific data, a process of controlling the light emitting controller so that the designated data that allows the selected light emitting element to emit light is generated, a process of generating signal data so that luminosity of the selected light emitting element is in a specific range, and a process of inputting the signal data to the memory unit.

8. The light emitting device according to claim 1, wherein:
the setting unit generates the setting signal having a magnitude indicated by the signal data read from the memory unit; and
the input circuit sequentially supplies the driving signal having the same magnitude as the setting signal to the holding units, and holds the driving signal to maintain the magnitude.

9. The light emitting device according to claim 1, further comprising a temperature measurement unit that measures present temperature, and outputs a temperature signal, wherein:
the memory unit respectively stores the signal data that indicates the magnitude of the driving signal, which is regulated such that luminosity of the plurality of light emitting elements becomes uniform at a reference temperature, for the plurality of light emitting elements;
the setting unit performs an operation process for the signal data read from the memory unit according to a difference between the present temperature indicated by the temperature signal and the reference temperature, and generates the setting signal; and
the input circuit sequentially supplies the driving signal having the same magnitude as the setting signal to the holding units, and holds the driving signal to maintain the magnitude.

10. The light emitting device according to claim 9, wherein:
the memory unit stores temperature data indicating the reference temperature along with the signal data; and
the setting unit performs the operation process for the signal data according to a difference between the present temperature and the referenced temperature indicated by the temperature data.

11. The light emitting device according to claim 9, wherein:
the memory unit respectively stores signal data, which indicates the magnitude of the driving signal regulated such that luminosity of the plurality of light emitting elements becomes uniform at the plurality or reference temperatures, for the plurality of light emitting elements; and the setting unit generates the setting signal by interpolating the signal data at the plurality of reference temperatures read from the memory unit according to the difference between the present temperature indicated by the temperature signal and the plurality of reference temperatures.

12. The light emitting device according to claim 1, further comprising a temperature compensation circuit that compensates for the setting signal according to the present temperature wherein:

the setting unit generates the setting signal having a magnitude indicated by the signal data read from memory unit; and the input circuit sequentially supplies the driving signal, which has the same magnitude as the setting signal compensated for by the temperature compensation circuit, to the holding units, and holds the driving signal to maintain the magnitude.

13. The light emitting device according to claim 1, comprising:

a plurality of integrated circuit chips respectively having at least one of the plurality of holding units and at least one of the plurality of supply units;

a control circuit chip that supplies the setting signal;

a first substrate in which the plurality of light emitting elements are arranged along a long side thereof, and the plurality of integrated circuits are arranged in a line along the plurality of light emitting elements; and a second substrate on which the control circuit chip is fixed, wherein:

the second substrate is connected to a short side of the first substrate; and the setting signal is supplied from the short side of the first substrate towards another short side thereof.

14. The light emitting device according to claim 1, comprising:

a plurality of integrated circuit chips respectively having at least one of the plurality of holding units and at least one of the plurality of supply units;

a control circuit chip that supplies the setting signal;

a first substrate in which the plurality of light emitting elements are arranged along a long side thereof, and the plurality of integrated circuits are arranged in a line along the plurality of light emitting elements; and a second substrate on which the control circuit chip is fixed, wherein:

the second substrate is connected to a center portion of the long side of the first substrate; and the setting signal is supplied from the center portion of the long side of the first substrate towards not only a short side thereof but also another short side thereof.

15. The light emitting device according to claim 13, wherein a flexible substrate, on which a wire for transmitting the setting signal is formed, is included between at least one of the adjacent integrated circuit chips.

16. An image forming apparatus comprising:
a light emitting device according to claim 1; and
an image carrier on which an electrostatic latent image is formed by light respectively irradiated from the plurality of light emitting elements.

17. A method of driving a light emitting device having: a plurality of light emitting elements that emit light to have luminosity depending on the magnitude of a driving signal; a plurality of holding units that are respectively disposed in the plurality of light emitting elements, and respectively hold the driving signal to maintain a magnitude regulated such that the luminosity of the plurality of light emitting elements becomes uniform; a plurality of supply units that are respectively disposed in the plurality of light emitting elements, and supply the driving signal, which is held by the holding units to have a certain magnitude for a period of time according to a gradation of light to be emitted, to a corresponding light emitting element; and a memory unit that respectively stores signal data indicating the magnitude of the driving signal, which is regulated so that luminosity of the plurality of light emitting elements becomes uniform, respectively, for the plurality of light emitting elements, the method comprising:

sequentially reading the signal data from the memory unit when power is supplied;

generating a setting signal based on the read signal data; and sequentially supplying the driving signal having a magnitude depending on the magnitude of the generated setting signal to the holding units, and holding the driving signal to maintain the magnitude.

18. The method according to claim 17, comprising:
sequentially selecting the plurality of light emitting elements;
allowing the selected light emitting element to emit light;
measuring luminosity of the selected light emitting element;
generating signal data so that the luminosity of the selected light emitting element is in a specific range; and
inputting the generated signal data to the memory unit.

19. The method according to claim 18, comprising, after the signal data is input to the memory unit:

respectively determining whether usage frequencies of the plurality of light emitting elements reach a predetermined usage frequency, and specifying the light emitting element of which usage frequency reaches the predetermined usage frequency;

allowing the specified light emitting element to emit light;
measuring luminosity of the specified light emitting element;
generating signal data so that the luminosity of the specified light emitting element is in a specific range; and
inputting the generated signal data to the memory unit.

20. The method according to claim 17, wherein:
the setting signal has a magnitude indicated by the signal data; and
the driving signal sequentially supplied to the holding units has the same magnitude as the setting signal.

* * * * *